United States Patent [19]
Potts et al.

[11] Patent Number: 5,432,940
[45] Date of Patent: Jul. 11, 1995

[54] SYSTEM AND METHODS FOR IMPROVED COMPUTER-BASED TRAINING

[75] Inventors: Richard J. Potts; Mark A. Vershel, both of Palo Alto, Calif.

[73] Assignee: Borland International, Inc., Scotts Valley, Calif.

[21] Appl. No.: 970,724

[22] Filed: Nov. 2, 1992

[51] Int. Cl.⁶ .............................................. G06F 9/06
[52] U.S. Cl. .................... 395/700; 364/DIG. 1; 364/286
[58] Field of Search ............... 395/12, 156, 650, 700, 395/800

[56] References Cited

U.S. PATENT DOCUMENTS

| | | | |
|---|---|---|---|
| 4,947,346 | 8/1990 | Kamiya | 364/DIG. 2 |
| 5,117,496 | 5/1992 | Stearns et al. | 395/700 |
| 5,175,812 | 12/1992 | Krieger | 364/DIG. 2 |
| 5,204,968 | 4/1993 | Parthasarathi | 364/DIG. 1 |
| 5,239,617 | 8/1993 | Gardner et al. | 395/12 |
| 5,317,688 | 5/1994 | Watson et al. | 395/161 |

*Primary Examiner*—Thomas M. Heckler
*Attorney, Agent, or Firm*—John A. Smart; Michael J. Ritter

[57] ABSTRACT

The present invention includes a computer-based training system (CBT) having one or more Application Translation Units (ATUs), a message engine, and a script engine. For one or more target applications of interest, an ATU is provided for processing events specific to that application, thereby trapping events and translating them into abstract messages or "meta-messages" for conveying information about a particular event to the system. A general operating system ATU is also provided for trapping general system events. Translated event messages are processed by event handlers. System or application-specific messages which are not of interest are simply allowed to pass through. The individual handlers dispatch their respective messages to the script engine, which includes instructions for directing the activity of the target application(s). The script engine, in turn, acts upon an incoming message. The dispatched message triggers appropriate action (as specified by instructions within the script).

33 Claims, 12 Drawing Sheets

SYSTEM AND METHODS FOR IMPROVED COMPUTER-BASED TRAINING

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and methods for assisting a user of a computer. More particularly, the present invention relates to help and computer-based training (CBT) systems which assist a user of a computer in the performance of a desired task.

With the advent of the personal computer, the use of computer systems is becoming increasingly prevalent in everyday life. Running software applications such as word processors and spreadsheets, for example, most workers can realize substantial productivity gains. In fact, most businesses today rely heavily on their computers for day-to-day operations.

The typical user of a computer today has little or no training in the computer sciences or even in the basic use of a personal computer. In order to operate a computer effectively, however, he or she must overcome a steep learning curve, one requiring mastery of a number of commands and data formats. One approach to this problem is to spend hours laboring over often-cryptic user manuals—an unattractive option at best. Instead, most users usually abandon printed manuals in favor of trial-and-error learning.

Some of the better manuals also include a written tutorial. This may be augmented by live or video-taped lectures. The approach is still time consuming, however; many users are simply unable to find sufficient time to complete the tutorials. Moreover, the approach tends to be boring and inefficient, with many users wasting time studying features which they will not use. And there is only so much one can learn from screenshots appearing in a book.

With advances in Computer and software technology, application software has not necessarily become easier to use either. Instead, technological advances have been largely employed to build more complex functions into existing applications, often resulting in a complicated user interface, such as a staggering array of icons, which leave the user even more bewildered. Thus, while computer applications have continued to increase in functionality, they have also greatly increased in complexity for the user.

The advent of computer-aided help systems perhaps represents the first successful effort to reduce the complexity of computers. Employing some type of "help" facility, these system provide on-line assistance to computer users. In response to a request by a user (e.g., "F1" or help key), such systems display textual help information on the display screen of the computer. Early help systems simply displayed the same (static) information, regardless of the context or circumstances surrounding the request for help. Later, help systems were refined to provide "context-sensitive help," that is, help information which takes into account what particular part or context of an application program the user is in (currently executing). In turn, help information relevant to this current context or user location is then displayed.

Later in the development of help systems artificial intelligence techniques were applied. U.S. Pat, No. 5,103,498, for example, describes an intelligent help system which includes a monitoring device for determining which events (both of the user and of the computer) to store as data in an historical queue. These data are, in turn, stored in a knowledge base. An inference engine tests pre-defined rules against the knowledge base data, thereby providing help appropriate for that particular user.

While undoubtedly an improvement over simple or even context-sensitive help systems, an intelligent help system in the end only can only provide help information to the user. Whether through words or through pictures, these systems only tell a user how to perform a particular type of task. Users certainly appreciate help information specific for the task at hand, but in practice the help information provided does not always convey information sufficient for the user. In essence, there is a limit to just how much information can be provided. And in those systems which provide very specific help information, entailing screen upon screen of detailed textual or graphic explanations, there is a limit to just how much information a user can or will read. Most users simply do not want to read detailed help information, even if provided on-line. Thus, no matter how intelligent or refined a help system is, it ultimately must resort to telling the user how to perform a given task. What the user really wants is for someone to show him or her how to perform the task at hand.

Another approach to assisting the user of a computer is an interactive software training system, as described in U.S. Pat. No. 4,622,013. That system includes a "tutor module" which interrupts the flow of data from the keyboard, interprets and manipulates the input data, selectively generates messages in response to the input data, and selectively allows a subset of the input data to be processed by the target computer program. A separate courseware module is offered for each selected or target computer program. Each courseware module includes a set of events or contextual circumstances relevant to the operation of the selected computer program.

With the advent of multimedia, particularly CD-ROM technology, sophisticated courseware tutorials are now possible. Employing sound and animation, for example, multimedia courseware can provide a "how-to" video, full-motion video available on-line at the press of a key. And as multimedia hardware costs drop, it is now feasible to built courseware into the applications themselves.

Courseware, especially multimedia courseware, offers several advantages over traditional help systems. For instance, one may design courseware which is responsive to unique user inputs, with each courseware module tailored to a specific target program. Courseware is also entirely self-paced, allowing novice users to learn applications at their convenience and at their own speed. Moreover, because these programs are typically interactive, users are less likely to daydream or be otherwise distracted.

Courseware systems are not without their shortcomings, however. In particular, these systems fail to take into consideration the unique "behavior" of the target application which is occurring at the same time. While the approach provides a module for trapping and acting upon selected user events, there is no true bi-directional communication between the tutor module and the user, on the one hand, and between the tutor module and the application on the other. As such, the system lacks the ability to modify and act on the target application in response to target application events themselves, not just user events.

Smart macros, such as Microsoft's "wizards", are another approach to computer-based tutorials. Wizards basically provide macros for completing standard tasks. In operation, a wizard suspends the task at hand and presents the user with a series of questions, typically presented through one or more modal dialog boxes. The wizard then executes or "plays" the macro using the responses as user input. Unless the user slows down the speed at which the macro is played (through a user-settable option), however, macro execution usually occurs too quickly for most users to observe (i.e., as a meaningful tutorial).

Unlike courseware, wizards operate on top of target applications, that is, preserving the look of "live" applications. This in situ approach is effective at demonstrating a particular type of task, such as creating a graph in a spreadsheet, while the user is within a target application. Wizard macros force a context switch, however. By suspending the target application while displaying dialog boxes, wizards do not provide a truly interactive tutorial—one having interaction between the user and the actual target application. Instead, wizards are limited to playing predefined macros for completing "canned" or pre-fabricated application tasks. Thus, although wizards offer some of the "look" of an application, they lack the true "feel" of the target application.

SUMMARY OF THE INVENTION

The present invention recognizes a need for a truly interactive help and tutorial system—one in which the user continues to interact with a target application while learning the task at hand. The present invention includes a computer-based training system (CBT) having one or more Application Translation Units (ATUs), a message engine, and a script engine.

Specific operation of the system is directed by a series of user instructions, typically provided by a tutorial writer. Within the script, links are established between the CBT system and one or more target applications of interest. Specifically, within a particular application links are established with individual controls (e.g., menu items, button controls, dialog boxes, and the like) so that the script writer has complete control over the behavior and actions of the target application.

For each target application of interest, an ATU is provided for processing events specific to that application. A general operating system (OS) ATU is also provided for trapping general system events. The ATUs function to trap events and translate them into abstract messages or "meta-messages" for conveying information about a particular event to the system. In this manner, low-level messages are abstracted into high-level, more meaningful messages which may be acted upon through the script.

Translated event messages are forwarded to the message engine for matching with event handlers. In a preferred embodiment, the message engine maintains a lookup table for matching messages with a desired target handler. System or application-specific messages which are not of interest are simply allowed to pass through.

From the message engine, the individual handlers dispatch their respective messages to the script engine. The script engine, in turn, matches an incoming message with reserved words of the script. Appropriate action, based upon use of the reserved word within the script, is then effected.

The present invention also includes a help information continuum for providing on-demand help and tutorial information for screen objects of interest. A computer help system of the present invention includes a computer having a screen device for displaying textual and graphic objects created by a user, a cursor positioning device for indicating a location on the screen device, and information inspector or continuum interface for automatically providing help and tutorial information specific to a particular screen object of interest (i.e., the one being inspected).

Glossary of Terms

Association Table; A container object used to organize data. Each item in the table has an associated tag to permit easy access.

CBT: Computer-based Training; the use of computers and specially designed tutorial programs for teaching.

CBT Message: A high-level or meta-message describing or encapsulating information about a particular event which has occurred, thereby allowing the user to abstract low level system messages into high level (and more meaningful) messages for script control.

CBT Object: An object, such as a C++ object, which can be placed in a dynamic linked library (DLL) and dynamically loaded when the tutorial is executed.

Control Window: A CBT object which is used for getting information from the user; typically, it includes a window having a number of dialog controls.

Interaction Objects: CBT objects which are used to interact with the user. These objects include Presentation windows, Control windows and message handlers.

Lesson Script: Script statements which control the execution of the CBT tutorial. Each lesson includes a collection of Scenes.

List: A container object which is used to hold unorganized data.

Message Handler: A CBT object which interacts with the target application. These objects are used to handle external events.

Object Property: An attribute or other data associated with a particular object, for example, name, title, color, and the like.

Performance: The execution of a CBT Scene by the CBT system.

Presentation Window: A CBT object which displays information to the user. This information may include text, graphics, and/or multimedia information.

Scene: A script object which describes the actions to perform at a particular point in the CBT lesson.

Script: A collection of statements which are understood by the Script engine.

Windows Hook: A function installed between Windows OS and an application to intercept Windows events before they are received by the application.

DETAILED DESCRIPTION OF A PREFERRED EMBODIMENT

The following description will focus on the presently preferred embodiment of the present invention, which is operative in the Microsoft ® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
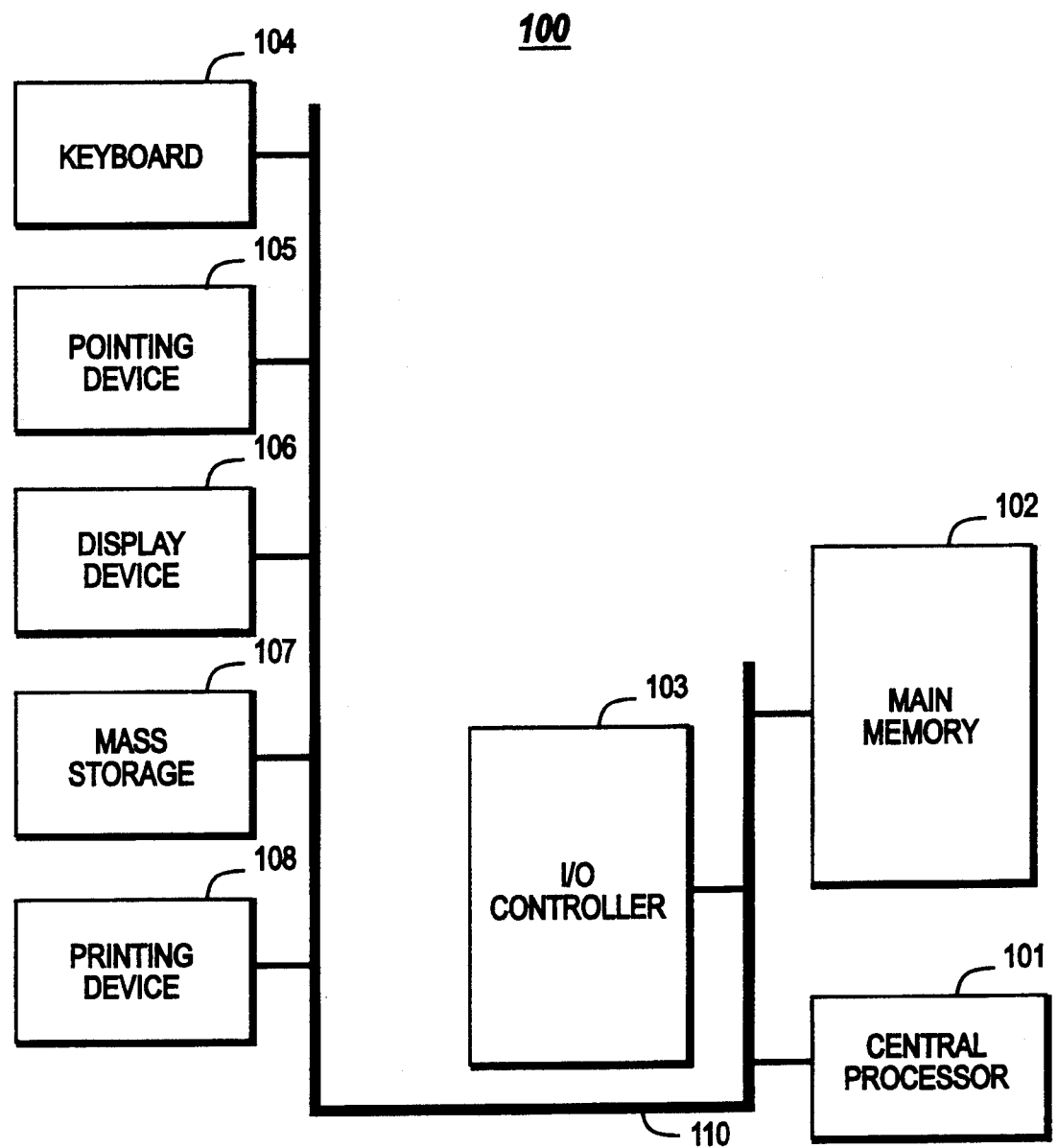
FIG. 1A is a block diagram of a computer system in which the present invention may be embodied.

As shown in FIG. 1A, the present invention may be embodied in a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

System Software

A. Overview

Figure 1B:
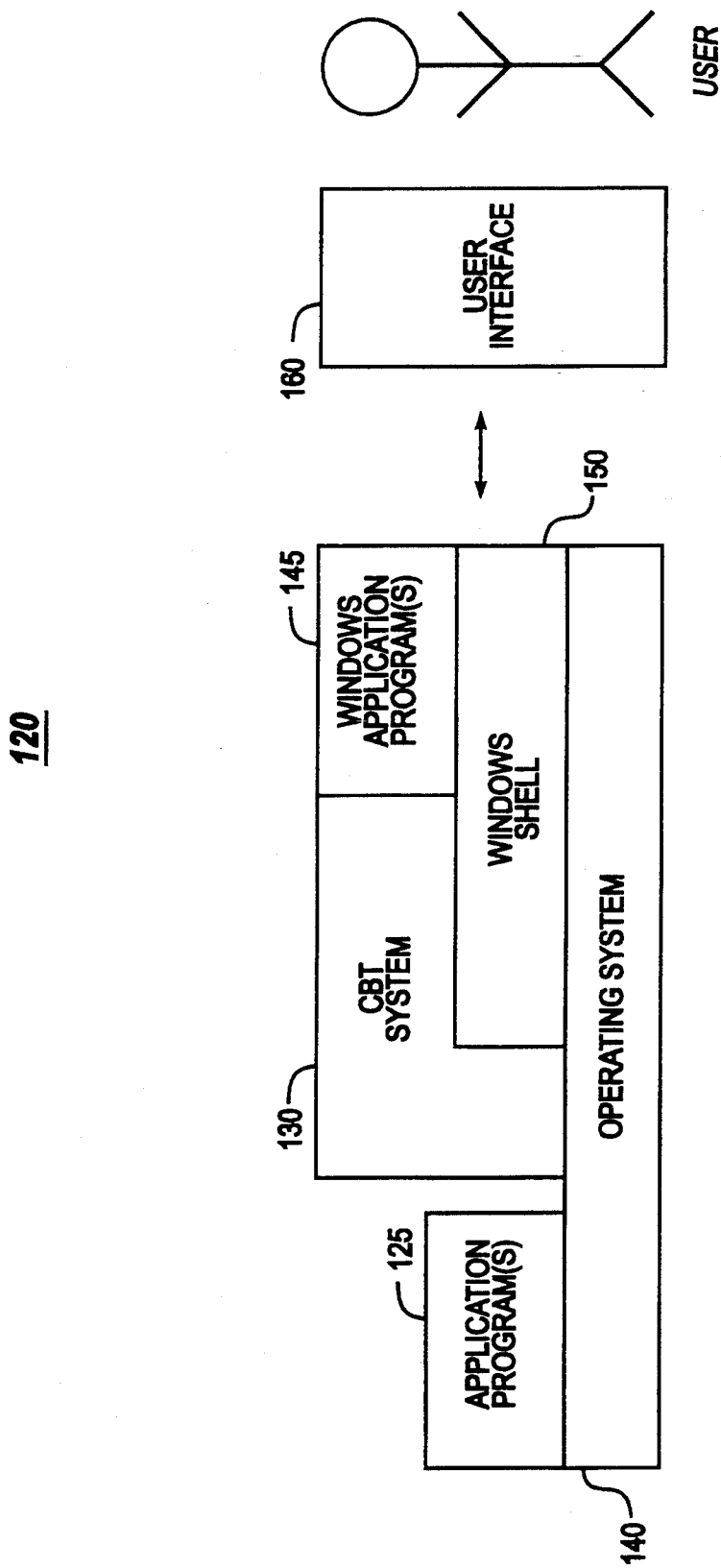
FIG. 1B is a block diagram of a software system of the present invention, which includes operating system, application software, and user interface components.

Illustrated in Fig. 1B, a computer software system 150 is provided for directing the operation of the computer system 100. Software system 150, which is stored in system memory 102 and on disk memory 107, includes a kernel or operating system (OS) 160 and a windows shell 180. One or more application programs, such as application software 170 or windows application software 190, may be "loaded" (i.e., transferred from storage 107 into memory 102) for execution by the system 100.

System 150 includes a user interface (UI) 165, preferably a graphical user interface (GUI), for receiving user commands and data. These inputs, in turn, may be acted upon by the system 100 in accordance with instructions from operating module 160, Windows 180, and/or application modules 170, 190. The UI 165 also serves to display the results of operation, whereupon the user may supply additional inputs or terminate the session. Although shown conceptually as a separate module, the UI is typically provided by Windows shell 180, operating under OS 160. In a preferred embodiment, OS 160 is MS-DOS and Windows 180 is Microsoft ® Windows; both are available from Microsoft Corporation of Redmond, Wash.

System 150 also includes a computer-based training (CBT) system 200 of the present invention for aiding users of the computer 100. As shown, the CBT system 200 interfaces with the system 100 through Windows shell 180, as well as interfacing directly through OS 160. Before undertaking a detailed description of the construction and operation of the CBT system 200 itself, however, it is helpful to first examine the general methodology of UI 165 and the event-driven architecture driving its operation.

B. Graphical User (Windowing) Interface

Figure 1C:
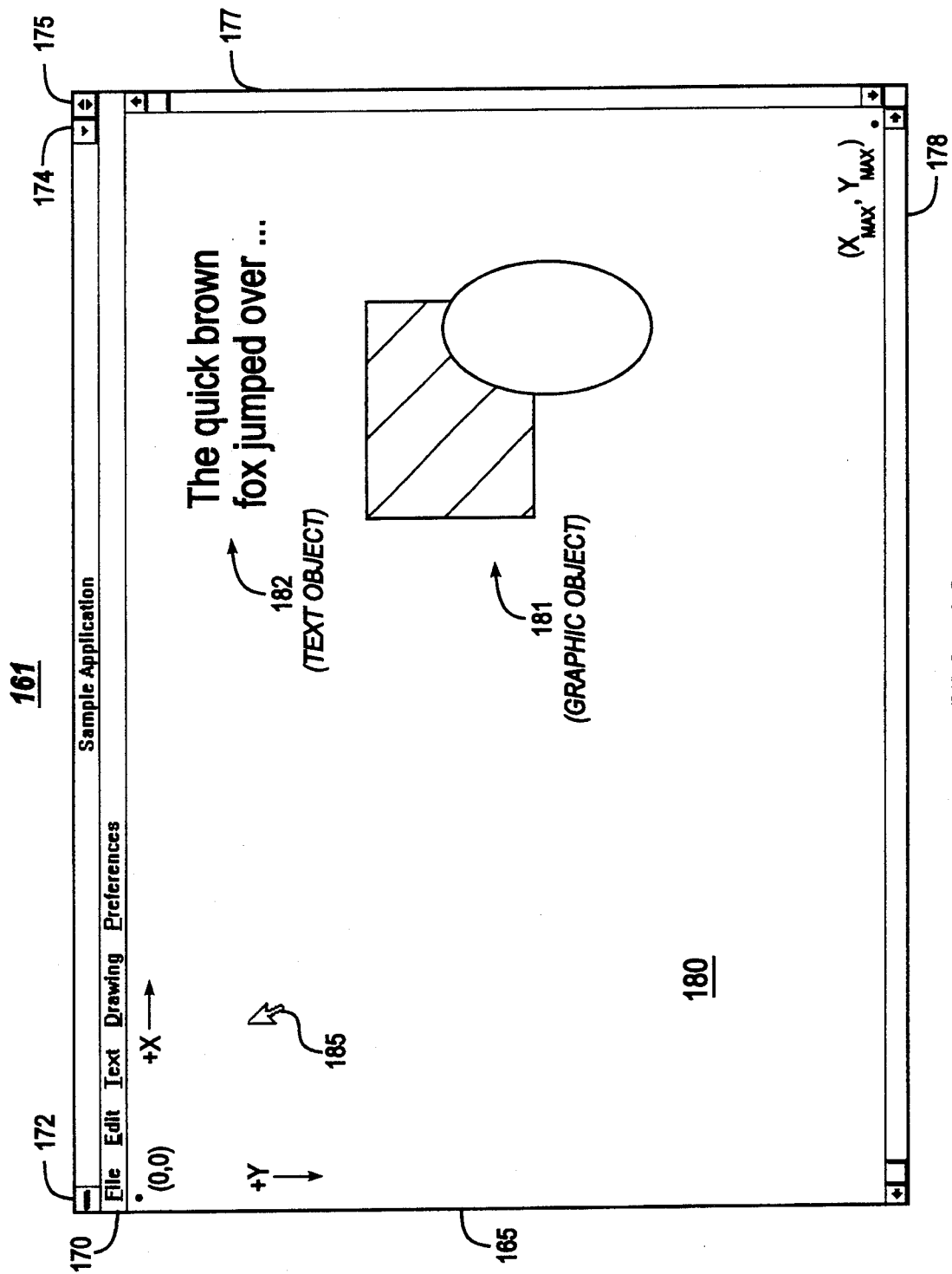
FIG. 1C is a bitmap screenshot illustrating the basic architecture and functionality of a graphical user interface in which the present invention may be embodied.

As shown in Fig. 1C, the system 100 typically presents UI 160 as a windowing interface or workspace 161. Window 161 is a rectangular, graphical user interface (GUI) for display on screen 106; additional windowing elements may be displayed in various sizes and formats (e.g., tiled or cascaded), as desired. At the top of window 161 is a menu bar 170 with a plurality of user-command choices, each of which may invoke additional submenus and software tools for use with application objects. Window 161 includes a client area 180 for displaying and manipulating screen objects, such as graphic object 181 and text object 182. In essence, the client area is a workspace or viewport for the user to interact with data objects which reside within the computer system 100.

Windowing interface 161 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 161 may be closed, resized, or scrolled by "clicking on" (selecting) screen components 172, 174/5, and 177/8, respectively. Keystroke equivalents, including keyboard accelerators or "hot keys", are provided for performing these and other user operations through keyboard 104.

C. Event-driven Architecture

Underlying the windowing interface is a message or event-driven architecture. This model is perhaps best described by contrasting its operation with that of a modal or sequential architecture which has been traditionally employed° In this manner, the reader may appreciate the added flexibility of a message-driven system—flexibility which is employed by the CBT system of the present invention for providing bi-directional communication not only between the CBT system and a user but between the CBT system and a target application as well.

Figure 2:
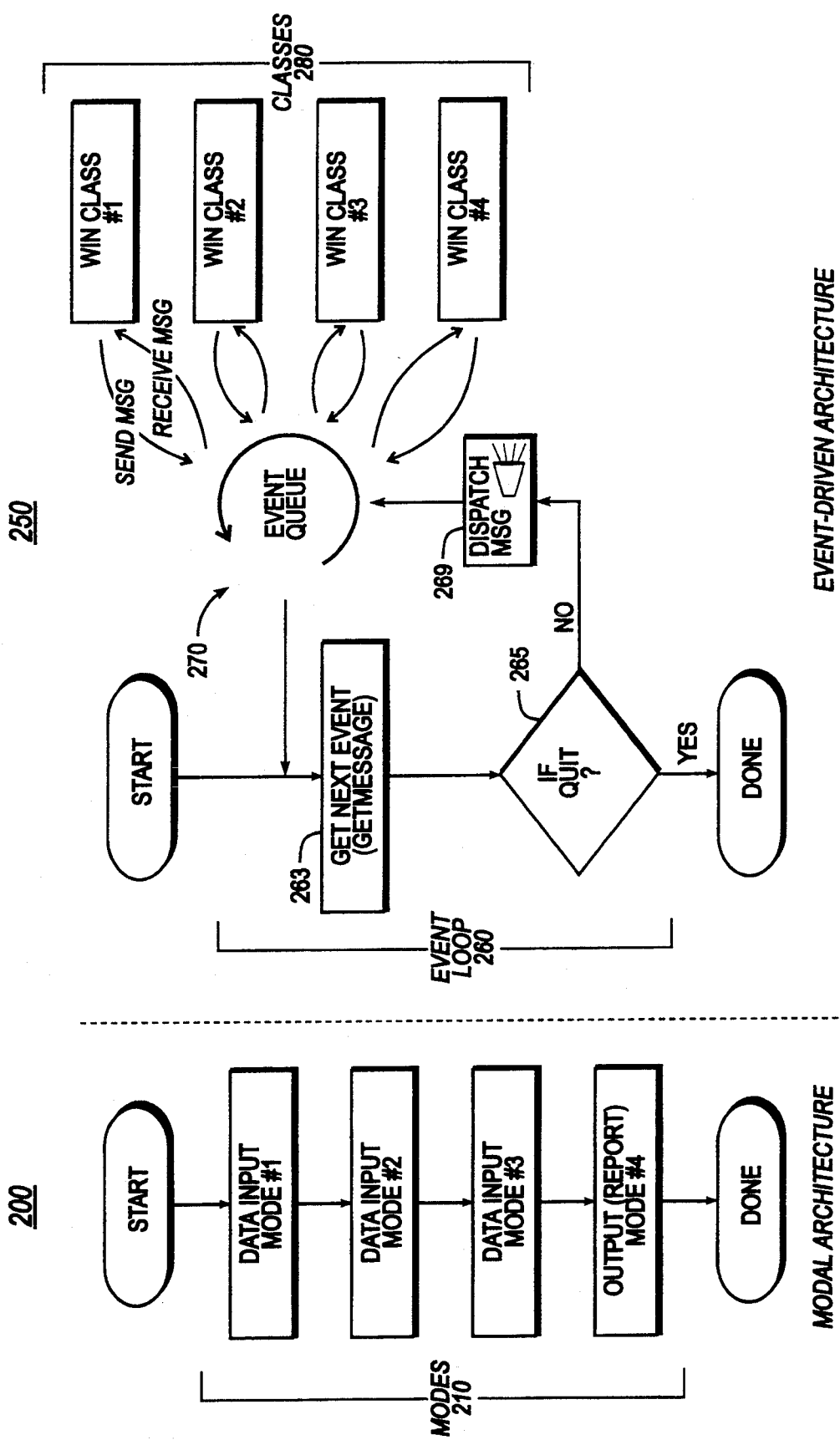
FIG. 2 is a pair of flowcharts contrasting the operation of conventional modal architecture with that of event-driven architecture.

As shown in FIG. 2, a modal program 200 comprises a series of discrete operating blocks or modes 210, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 200 follows a fairly rigid sequence of operation, with each input or entry mode demanding successful completion before the program proceeds to the next step.

While a modal program is relatively easy to design and implement, it is not so easy to use. The design certainly ensures that all required information is entered, but only at the expense of forcing users to operation in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2, an event-driven architecture 250 eschews a pre-selected sequence, opting instead for an "event loop." The event loop 260 is a centralized mechanism for processing messages about user and system events. It includes an event queue 270 and mechanisms for retrieving 263 and dispatching 269 messages to various window classes 280. Before each of these components is described in detail, it is helpful to have a firm understanding of "messages."

In a typical modal environment, especially those typified by a character-based UI, a program reads from the keyboard by making an explicit call to a function, such as the C function getchar(). The function typically waits until the user presses a key before returning the character code to the program; all system activity ceases until completion of this one step. In a Windows environment, in contrast, the operating system uses messages to manage and synchronize multiple applications and hardware events, such as clicks of a mouse or presses of a keyboard, which are converted to messages by Windows event handlers.

From a programming perspective, a message is simply a data structure containing information about a particular event. In Microsoft Windows, a message is a 16-bit unsigned integer which serves as a symbolic constant for a particular event; packaged within this integer is a message identifier and message parameters, which vary with each event type represented. For example, messages from a window object might include information about creating (WM_CREATE), closing (WM_CLOSE), moving (WM_MOVE), and re-sizing (WM_SIZE) the window. The input messages are collected in a system-wide queue and then directed to the proper window. These messages, along with timer and screen paint messages, must be passed to the target application(s) of interest.

A mechanism is provided for retrieving messages from the system queue and dispatching them to the appropriate application which, in turn, may proceed to process any message that arrives. Each window belongs to a certain window type which defines certain characteristics common to all windows of that type. Associated with each type is a Windows function which processes all messages sent to windows of its type. An application queue is provided where Windows may place messages that belong to a specific application. When the application is ready to receive input, it simply reads the awaiting messages. If none are found or if there exists a message for other applications with higher priority, Windows passes control to the other applications.

The message or event loop 260 shown in FIG. 2, for example, may be simply coded as:

```
while (GetMessage (&msg, NULL, 0, 0))
    {
    TranslateMessage (&msg)
    DispatchMessage (&msg)
    }
return msg.wparam
}
``` where a message (&msg) is retrieved by a call to GetMessage (step 263); if needed, the retrieved message may be translated by a call to TranslateMessage() and then dispatched by a call to DispatchMessage (step 269). This "while" loop continues until the GetMessage function returns a value of zero—indicating that the loop has read a WM_QUIT message from the queue, telling the application to end (yes at step 265).

In addition to the messages generated by Windows, applications can create their own messages and place them in the application queues of other applications. The SendMessage and PostMessage functions let applications pass messages to their windows or to the windows of other applications. The PostMessage function directs Windows to post the message by placing it in the application queue. Control returns immediately to the calling application, and any action to be carried out as a result of the message does not occur until the message is read from the queue.

The SendMessage function, on the other hand, directs Windows to send a message directly to the given Windows function, thereby bypassing the application queue. Windows does not return control to the calling application until the Windows function that receives the message has processed it. Such an unqueued message, however, is generally a message that affects the window only.

The general mechanism for retrieving and dispatching messages in an event-based system, such as Microsoft Windows, is known in the art; see, e.g., Petzold, C., *Programming Windows*, Second Edition, Microsoft Press, 1990. Additional information can be found in Microsoft's Window Software Development Kit, including: 1) Guide to Programming, 2) Reference, Vols. 1 and 2, and 3) Tools, all available from Microsoft Corp. of Redmond, Wash. The disclosures of each of the foregoing are hereby incorporated by reference.

Computer-based Training System

The following description of the CBT system of the present invention will focus on the presently preferred embodiment which includes components implemented in an event-driven architecture with the C++ programming language. In particular, an object-oriented model is adopted whereby new objects may be created from existing objects (classes). The general features of C++, including data encapsulation, inheritance, and polymorphism, as well as C++ techniques for implementing class hierarchies and class methods are known; see e.g., Ellis, M. and Stroustrup, B., *The Annotated C++ Reference Manual*, Addison-Wesley, 1990. Additional information about object-oriented programming and C++ in particular can be found in Borland® C++ 3.1: 1) User's Guide, 2) Programmer's Guide, and 3) Library Reference, all available from Borland International of Scotts Valley, Calif. The disclosures of each of the foregoing are hereby incorporated by reference.

A. Overview

Figure 3:
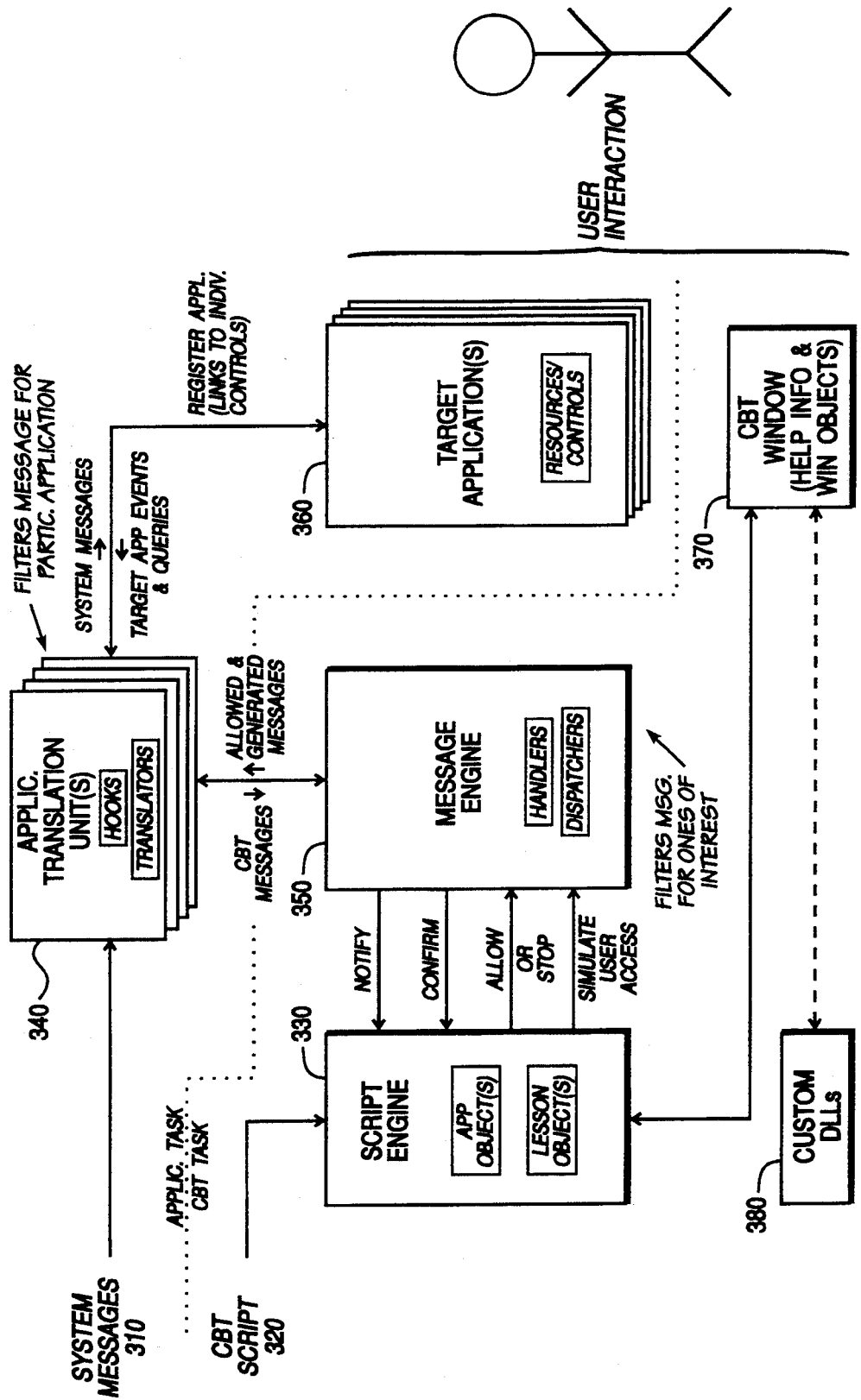
FIG. 3 is a block diagram of a computer-based training (CBT) system of the present invention.

Referring now to FIG. 3, a computer-based training system 300 of the present invention includes one or more Application Translation Units (ATUs) 340, a Message Engine 350, and a Script Engine 330. Also shown, the system 300 includes a CBT window object 370 operably coupled to the Script Engine; CBT window object 370, in turn, may be linked to one or more custom Dynamic Link Libraries (DLLs) 380.

Driven by a set of instructions or script 320, the system 300 monitors various events of the Windows system and desired target applications. Messages from these events, including system messages 310 and target application messages, are trapped by the ATUs 340 and reported to the Message Engine 350 as CBT messages. The Message Engine, in turn, dispatches the messages according to handlers specified by the Script Engine 330, operating under the control of script 320. Messages of interest are processed as desired; others are simply allowed to pass through. The construction and operation of these components will now be described in further detail.

1. Application Translation Units and their Target Applications

In normal operation of the system 100, a user is using one or more Windows application programs, for example, programs 145 of FIG. 1B, which can be a spreadsheet, wordprocessor, database, or the like. For each application where CBT support is desired, an application-specific ATU 340 is provided for processing events specific to that application (now shown as target application 360 in FIG. 3). Thus, each ATU 340 is a module, preferably implemented as a dynamic link library (DLL), for processing messages for a specific target application.

In addition to the application-specific DLLs, ATUs 340 include a Windows ATU. In contrast to the other ATUs which hook into specific target applications, the Windows ATU processes all Windows events, including system messages 310. In this manner, general system events, that is, ones not specific to any particular application, may be processed by the CBT system 300 as well.

Whether application specific or not, each ATU functions to trap events and convert them into "CBT messages"—a lingua franca or common language for all events, whether Windows or application-specific, occurring within the system. More particularly, a CBT message is a meta-message, that is, a high-level message describing one or more events which have occurred. For instance, instead of monitoring numerous, low-level system messages, such as WM_RBUTTONDOWN, WM_LBUTTONDOWN, WM_RBUTTONUP, WM_LBUTTONUP, and the like, the user/script writer need only monitor a single message CBT_MOUSECLICK; the task of determining what the Windows system or application is doing is left to the ATUs. By abstracting low-level system messages into high-level (and more meaningful) CBT messages, the system of the present invention greatly simplifies script design and writing.

A CBT message, which is stored internally as an integer, represents a particular type of event. Information or data particular to each event, such as active window, cursor location, and the like, on the other hand, are packaged as a discreet data object (EventInfo object) fully describing the event. EventInfo objects, along with CBT messages, are dispatched from the ATU to the Message Engine 350 for further processing.

2. Message Engine and Script

The Message Engine 350 determines which of the many CBT messages it receives is of particular interest to the CBT system, as it operates under the direction of a script 320. At startup, each target application of interest to the script 320 is registered with the Message Engine. The script 320, which itself includes a collection of objects, may be compiled, pre-compiled, pseudocompiled, or the like, as desired for a particular platform. In a preferred embodiment, script 320 is pre-tokenized, whereby source listings and comments (optionally) are stored in a compact form which may be reconstructed into the original source. Thus, script 320 need only be a set of instructions; no particular format is required by the present invention.

For each application registered, the Message Engine maintains one or more "handlers" or modules for processing events specific to that application (as represented by the CBT messages). Thus, the Message Engine manages a list of target handlers for determining which CBT messages are of interest to the script 320, that is, which messages map into the list.

Messages which are of interest to the system, i.e., those specified by the script 320, are trapped and forwarded to a designated handler. Those messages which are not of interest are allowed to "fall through" (i.e., be passed on to) the individual target applications 360. In essence, the Message Engine filters the events for a particular application so that only those of interest, that is, those having a handler defined for the event, are processed.

B. System operation

1. Method: CBT session

Figure 4A:
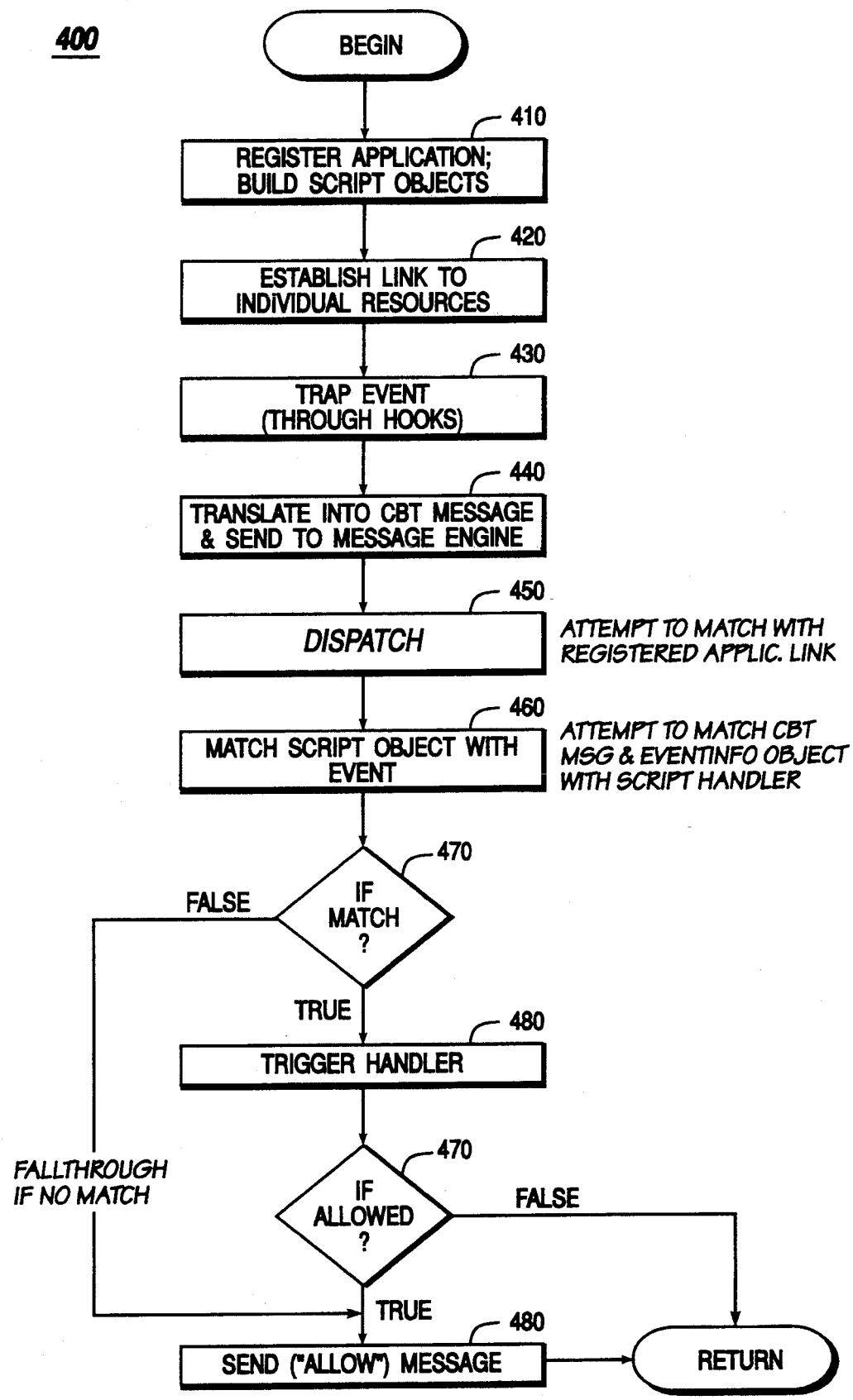
FIG. 4A is a flowchart illustrating a method of the present invention for operating the CBT system of FIG. 3.
Figure 4B:
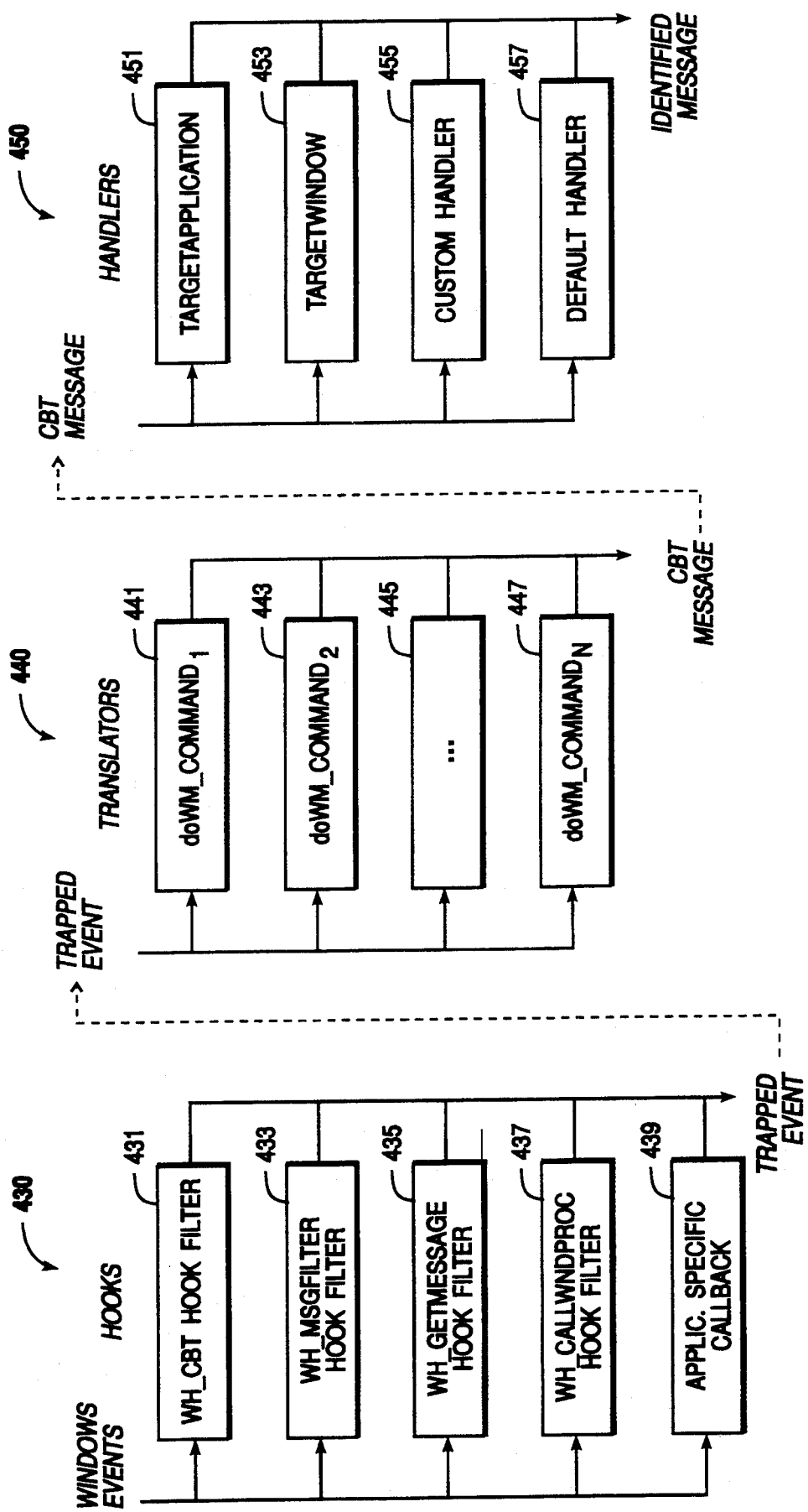
FIG. 4B is a flowchart illustrating the operation of hooks, dispatchers, and handlers of the method of FIG. 4A.

Referring now to FIGS. 4A-B, the general method of operation for the system 300 is illustrated by a flowchart 400. While the general methodology remains the same from one CBT session to another, the reader should understand that the specific steps of any one CBT session are dictated by instructions and script objects defined in the script 320. For instance, the script 320 states which specific target applications will be registered with the Message Engine and which events of those applications will be dispatched. Thus, the following description illustrates the basic framework in which the CBT system operates.

Under the direction of the script 320, at step 410 the CBT system registers a target application of interest by creating a CBTApplication object. Serving as the main entry point for the CBT system, this object initializes and executes the script tutorial. Moreover, the object initiates sessions with the Message Engine and Script Engine and acts as a centralized dispatch point for all external functions and object method calls within each CBT lesson. From here individual CBT lessons are loaded and performed.

When a lesson script is loaded the CBTApplication object creates a CBTLesson object which is responsible for managing that particular lesson. The CBTLesson object reads the lesson script and builds a deck of CBTScene objects, with each corresponding to a scene described in the lesson script. Alternatively, each scene may be constructed on-the-fly, particularly in high-performance environments. The CBTLesson object resembles a state machine; it maintains the active scene (active state) and sends appropriate script scenes (CBTScene objects) to the Script Engine 330 for presentation. Each object is directly accessible to the script writer through script variables; for example, the CBTApplication object is accessed through a theCBTApp global variable, the CBTLesson object through a theCBTLesson global variable.

To complete the initialization of step 410, the target application is registered with the Message Engine 350. In particular, hooks are installed by a corresponding ATU 340 so that events within the target application of interest are trapped. As set forth below, these events will, in turn, be reported to the Message Engine 350 as CBT messages.

At step 420, script-specified links are established to individual resources of interest. Within the target application itself, various resources (e.g., buttons, menus, and the like) may be of interest to the script writer. For example, if one were interested in a particular button of the target application, such as a "help" button, that button may be registered with the Message Engine 350. Events associated with that button (e.g., "mouse enter" the button) are then trapped for processing by an ATU.

The links are specified within the CBT script 320 as follows. In a preferred embodiment, a link is established to an individual resource or control by indicating a selected one of its Windows class name, Window title, or Resource ID, all of which are readily accessible Windows data structures. Commonly, a link will be established by using the Resource ID. Particular links may be created or removed during a session, as desired.

At step 430, the system traps various events which are relevant to the established links. This operation, shown in further detail in FIG. 4B, occurs as follows. Every time that a message arrives at the message queue of a target application, a message filter hook function (WH_MsgFilter) 431 is called. First, the hook function determines if the message represents a task which has been "hooked," that is a specific link for this event of the target application has been created. If not, the event is passed down the hook chain for processing by one of the other hooks (i.e., hooks 433, 435, 437). The Windows hook 437, for example, traps all window messages (WM_). In this fashion, which hook function is invoked depends on what type of message comes into the target application. By way of illustration, hooks may be installed as follows:

```
BOOL installHooks(CbtEntry *pEntry)
{
    if( ! pEntry )
        return FALSE;
    // Note that the fourth parameter below may receive a task handle of
    // a target application, whereupon the hook is installed in that
    // application. When receiving a NULL parameter, the hook installs
    // to applications.
    // CBT hook -- allow CBT system to stop events from progressing
    hCBTHook =
        SetWindowsHookEx(WH_CBT, (HOOKPROC)cbtFilter, hInstance, NULL);
    // Msg filter hook -- dialog boxes and menus
    hMsgHook =
        SetWindowsHookEx(WH_MSGFILTER, (HOOKPROC)msgFilter,
                    hInstance, NULL);
    // Get msg hook
    hGetMsgHook =
        SetWindowsHookEx(WH_GETMESSAGE, (HOOKPROC)getmsgFilter,
                    hInstance, NULL);
    // Windows hook
    hCallWndProcHook =
        SetWindowsHookEx(WH_CALLWNDPROC, (HOOKPROC)callWndProcFilter,
                    hInstance,NULL);
    return( hCBTHook      && hMsgHook &&
            hCallWndProcHook   && hGetMsgHook );
}
```

As shown, a callback function is installed for each hook; each callback function, in turn, serves as an entry point into an ATU. Additional information on the installation and use of hooks in Microsoft Windows can be found in the Microsoft's Window Software Development Kit referenced above.

In addition to installing hooks to trap system messages, one or more application-specific hooks (callback functions) 439 are installed as well. For instance, a target application may be spreadsheet which includes its own internal set of messages, for example, SS_CELLSELECT, SS_CELLEDIT, SS_BLOCKDEFINE, and the like. To monitor these messages, an ATU may register an application-specific callback function with the target application, in effect dynamically binding the ATU to its target application. At runtime, the application invokes the callback function for dispatching internal or application-specific messages. Thus, the CBT system of the present invention is not limited to Windows events and their messages; instead, the CBT system may receive and translate any messages of interest, whether system wide or strictly internal.

At step 440, events which are trapped by the Application Translation Units 340 are "dispatched" to the Message Engine 350 as CBT message/event information objects. As shown in particular detail in FIG. 4B, the dispatch module of each ATU includes a function corresponding to each Windows event. Thus, for the WM_COMMAND, WM_MENUSELECT, WM_BUTTONDOWN, and WM_SETCURSOR messages, the following translate functions may be defined:

int doWM_Command (CbtEntry *pEntry, MSG *msg);
    int doWM_MenuSelect (CbtEntry *pEntry, MSG *msg);
    int doWM_ButtonDown (CbtEntry *pEntry, MSG *msg);
    int doWM_SetCursor (CbtEntry *pEntry, MSG *msg);

each designed for processing its particular event.

The operation of an ATU dispatcher will be demonstrated by the processing of Windows messages for determining if the cursor has traversed a window boundary (i.e., entered a new window); this example illustrates how a multitude of Windows WM_SETCURSOR messages can be converted into MOUSELEAVE and MOUSEENTER meta-messages. The dispatching of other events as CBT messages is set forth hereinbelow as Appendix A.

Figure 5A:
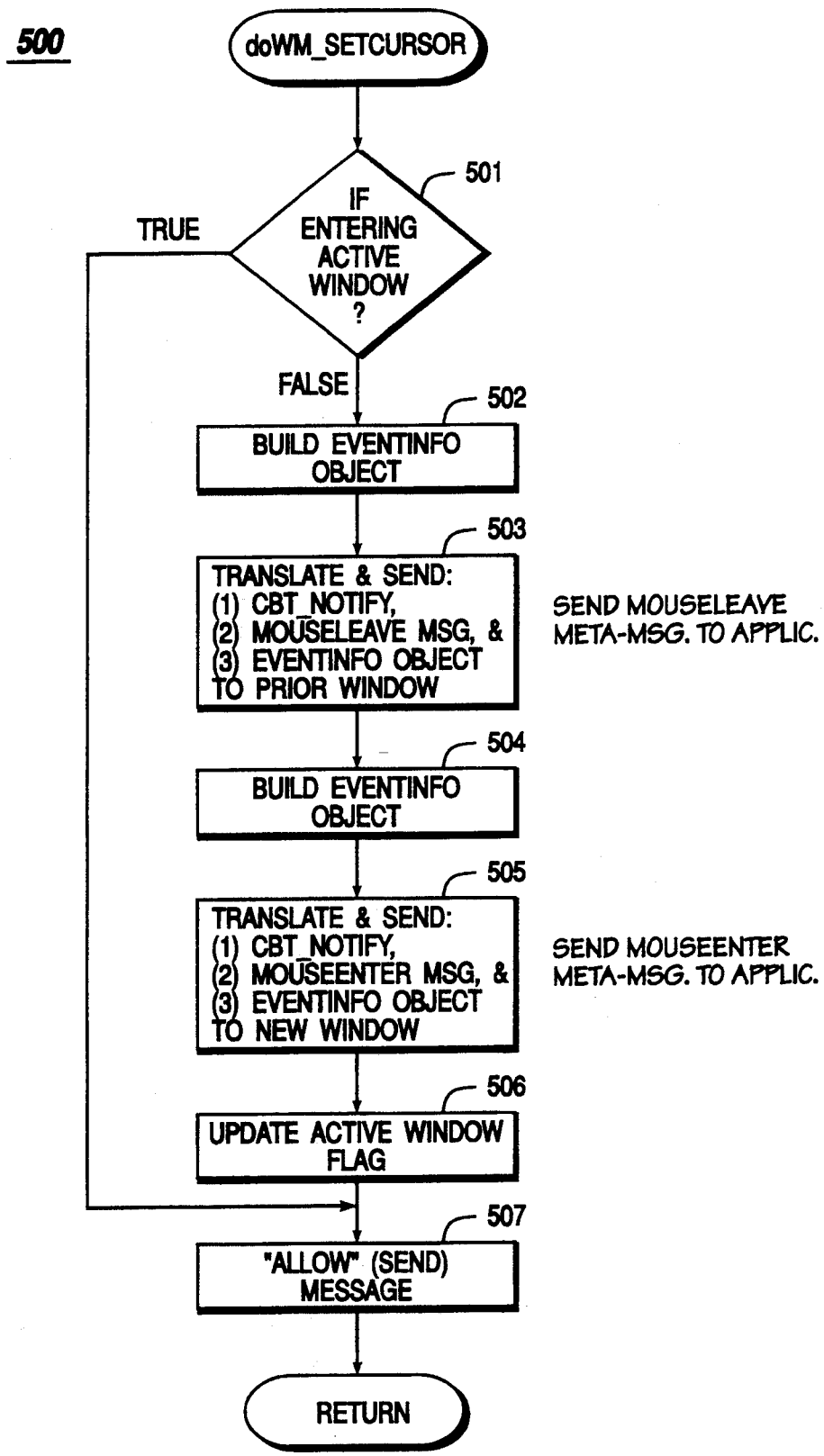
FIG. 5A is a flowchart illustrating the operation of an exemplary event handler of the present invention, which includes the dispatching of event information (EventInfo) objects.

As shown in FIG. 5A, a doWM_SetCursor dispatch method 500 is invoked whenever a SetCursor message is trapped by the ATU (i.e., captured by a hook function before the event has been received by the application). Here, the script writer is not interested in the screen cursor simply entering an already active window; thus, the method simply "allows" the Windows message to be passed to the target application at step 501 and returns. Specifically, since the screen cursor is entering a window which is already active, no particular CBT-generated messages or other intervention are desired by the script writer at this point; hence, the WM_SETCURSOR message is allowed to pass through.

Continuing the example, the script writer may specify that the event of a cursor leaving an active window is of interest and should be trapped. Since the cursor is not simply re-entering the active window (no at step 501), the window which the cursor is leaving should be notified of the event. The CBT system notifies the Message Engine of this action as follows. First, at step 502, the information pertaining to the window where the event occurred is encapsulated into a C++ object (which is derived from an EventInfo class hierarchy, described in further detail hereinbelow). At step 503, the information object and a "MouseLeave" message are dispatched to the previous (departing from) window, with the message being denoted as a "NOTIFY" message.

In a preferred embodiment, two different classes of messages are provided: CBT_NOTIFY and CBT_CONFIRM. Those messages which are purely informational, such as mouse movements, are CBT_NOTIFY messages. Those which can be stopped before they reach the target application, on the other hand, are called CBT_CONFIRM messages. Each is registered with Windows as an application-specific Windows event. Using two methods defined within EventInfo objects, the script 320 can allow or prevent a CBT_CONFIRM type message from reaching the target application. Specifically, a stopMessage method is invoked which determines (based on script instructions) whether to allow the message to pass through to the target application.

After step 503, the method proceeds to alert the Message Engine that the cursor is entering a new window. In a manner similar to sending the "MouseLeave" message, the method first builds an EventInfo object at step 504. Next, a "MouseEnter" message of type CBT_NOTIFY is dispatched to the application, along with the information for the event (EventInfo object), at step 505. At step 506, an active window flag is set; this is the flag that is read in step 501 to determine if the mouse cursor is entering the active window. Finally, the method concludes by passing the message on to the application (i e., "allow" message) at step 507. At the conclusion of the method, memory for the EventInfo objects may be recovered (e.g., using manual or automatic garbage collection techniques).

For purposes of illustration, one may implement such a method in the C++ programming language as follows:

```
int doWM_SetCursor(CbtEntry *pentry, MSG *msg)
{
    EventInfo *pObject = (EventInfo *)NULL; // init EventInfo
    if( pEntry->hActiveWnd == (HWND)(msg->wParam) )      // steps 510/507
        return MSG-ALLOW;
    pObject = new WindowInfo( pEntry->hActiveWnd; );     // step 502
    DispatchToCbt(pEntry, CBT_NOTIFY,
            TM_MOUSELEAVE, (LPARAM)pObject);             // step 503
    pObject = new WindowInfo( (HWND)(msg->wParam) );     // step 504
    DispatchToCbt(pEntry, CBT_NOTIFY,
            TM_MOUSEENTER, (LPARAM)pObject);             // step 505
    pEntry->hActiveWnd = (HWND)(msg->wParam);            // step 506
    return MSG_ALLOW;                                    // step 507
    // garbage collection performed by the system
}
```

Here, pEntry is a pointer to a record, CbtEntry, which is updated. The record includes handles to the hooked task (application that has been hooked) and the currently active window:

```
typedef struct_CbtEntry {
    HTASK   hHo-okedTask;
    HWND    hActiveWnd;
} CbtEntry; // pEntry points to this
```

As shown, a meta-message may maintain its own data structures for tracking events at a higher level (e.g., the status of the active window).

The DispatchToCbt function, on the other hand, is conveniently viewed as two halves of a process. Specifically, the Message Engine registers a callback function with the ATU. The operation proceeds as follows. On the ATU side, the ATU passes to the DispatchCBTMessage method a task handle for identifying a particular application; since the system processes multiple applications, this mechanism serves to distinguish between different applications (and their instances):

```
void DispatchToCbt(HTASK hHookedTask, UINT Msg, WPARAM wParam, LPARAM
lParam)
{
    if( pCbtDispatchFunc )
        (pCbtDispatchFunc) (hHookedTask, Msg, wParam, lparam);
}
```

In this manner, an ATU filters or groups events by target application and communicates its events as meta-messages to other CBT components. At the completion of step 440 of FIG. 4A, the ATU has dispatched the CBT message, its type, and the EventInfo object to the Message Engine 350, thereby fully communicating an event which it has trapped.

Not all events are of interest, however. Thus, the events should be filtered so that only those of interest are acted upon. At step 450, the Message Engine performs this task by comparing the CBT message against known event handlers. In other words, the engine attempts to dispatch CBT messages of interest—ones having a handler define for the event. Thus on the Message Engine side, the Message Engine determines which entry in its table corresponds to that task:

(CBT_NOTIFY) or preventable (CBT_CONFIRM). A "mouseEnter" message, for example, belongs to a TargetWindow Handler Class; the message is therefore processed by the TargetWindow handler 453. An application specific event, such as an SS_EDITCELL message from a spreadsheet target application, on the other hand, would typically be passed to the TargetApplication handler 451. Finally, messages without a handler, that is, those which the script writer has no particular interest, may be passed to a default handler (e.g., for ignoring, discarding, or otherwise invoking a desired default action); thus, the script writer need only enumerate handler methods for messages of interest.

If matched with a handler, the message is then dispatched. Specifically, the handler extracts properties for the message and the accompanying EventInfo object. For a message of TargetWindow handler class, for instance, available object properties include:

1) Name: Title string of the control;
2) Class: Windows class of the control;
3) ID: Resource ID of the control;
4) Style: Style flags of the control;
5) Enable: Whether the control is enabled;
6) Position: Coordinates of the control; and
7) EventInfo: Current EventInfo object, if any.

Additional exemplary properties which are available for various messages handler classes are set forth hereinbelow as Appendix C.

```
void CALLBACK MessageEngine::DispatchCBTMessage(HTASK hTarget,
                    UINT cbtmsg, WPARAM wParam, LPARAM lParam)
{
    CbtSession *pSession = GetSessionFromTask(hTarget);
    if( pSession )
        SendMessage(pSession->hMsgPane, CbtMessages[cbtmsg],
            wParam, lParam);
        // Notify application handler
        // where pSession is the current application session
        // (determined from hTarget);
        // CbtMessages[cbtmsg] is the table lookup for the
        // CBT message ("confirm" or "notify";
        // wParam is the CBT message type (TM_msg); and
        // lParam is a pointer to the EventInfo object.
}
```

With particular reference to FIG. 4B, this process is illustrated. Message Engine filters CBT messages through a plurality of message handlers, including, for example, a TargetApplication handler 451, a TargetWindow handler 453, a Custom handler 455, and a Default handler 457; other exemplary handlers are set forth hereinbelow as Appendix B. CBT messages of interest will be passed to a particular handler. As shown in Appendix B, each message belongs to a particular Message Handler Class and is either informational As an alternative to defining several event handlers, a more preferred embodiment provides only two basic event handlers: an Application Link handler and a Window Link handler. Each is an object having various handler methods for appropriately responding to each message passed. Based on the lookup performed by the Message Engine (i.e., NOTIFY or CONFIRM), an Application Link handler may, for example, effect the dispatching as follows:

```
RESULT CALLBACK ApplicationLink::wndProc(HWND hwnd, UINT Message,
                    WPARAM wParam, LPARAM lParam)
{
    // First, get handler (from link registered)
    ApplicationLink *pWindow = (ApplicationLink *)GetWindowLong(hWnd, 0);
    if( pWindow )
```

```
{
    if( Message == CBT__notify ) // Msg is a NOTIFY msg
    {
        EventInfo *pInfo = (EventInfo *)lParam;
        // Recall that Event info includes one or more of a win class,
        // name, and resource ID. If exact information is not provided
        // (e.g., just "OK" button), do "fuzzy" match (i.e., match as
        // much as possible:
        pWindow->doDispatchNotify(wParam, pInfo);
        pInfo->Finished( );
        return TRUE;
    }
    else if( Message CBT-confirm ) // Mag is a CONFIRM msg
    {
        EventInfo *pInfo = (EventInfo *)lParam; // Event info
        pWindow->doDispatchConfirm(wParam, pInfo);
        pInfo->Finished( );
        return TRUE;
    }
}
// on return, call WinProc instantiated w/ applic. link
return DefWindowProc(hWnd, Message, wParam, lParam);
}
```

Here, the doDispatch-methods communicate directly with the Script Engine. In turn, the Script Engine responds according to script objects defined within the active script. By invoking the stopMessage method for specifying whether an event is allowed, for example, events may be stopped from reaching a target application; in most instances, however, the script writer will simply specify the default—that the event should simply pass on through to the target application.

The script writer may provide methods for handling the various events of interest, or he or she may rely on default methods which are defined by the CBT system. In operation, a CBT message is passed to the objects. Each object, in turn, is responsible (through its method definitions) for knowing which messages are of interest, and how each one of interest should be processed. In a target application, for example, if the script writer hooks a window link up to a list box of the application, he or she should provide methods for handling the event (as communicated by CBT messages) of that list box.

Figure 5B:
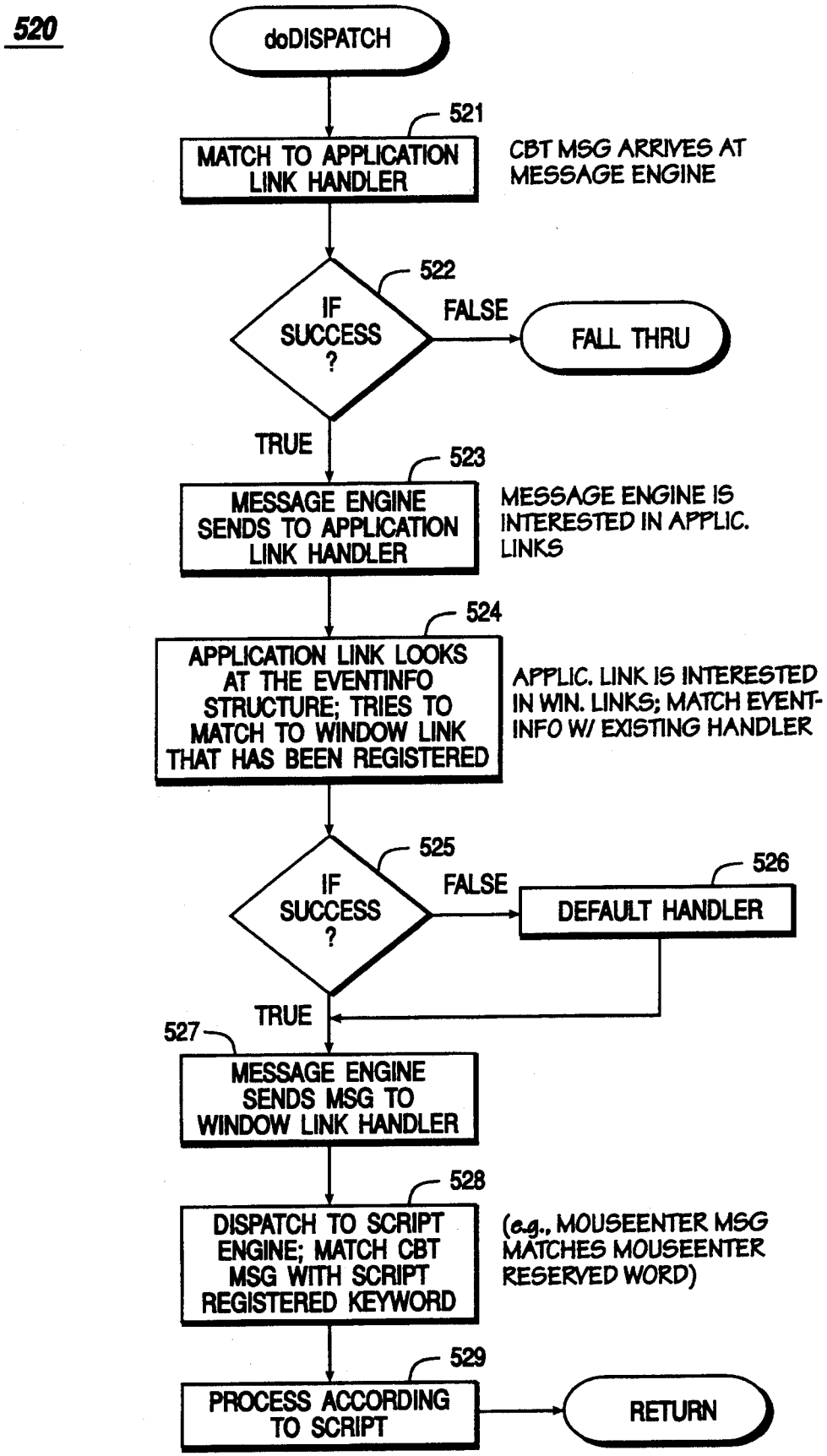
FIG. 5B is a flowchart illustrating a method of the present invention for dispatching meta-messages.

Referring now to FIG. 5B, the overall method of dispatching messages is summarized. In a doDISPATCH method 520 of the present invention, a CBT message arrives at the message engine and is processed as follows. First, in step 521, an attempt is made to match the message to an application link handler. If the attempt is unsuccessful (no at step 522), then the message is simply allowed to "fall through" (i.e., left unprocessed, or processed by a default handler). Otherwise (yes at step 522), at step 523 the message engine forwards the CBT message (with EventInfo object) to the identified application link handler.

At step 524, the application link handler examines the EventInfo object and attempts to match it with a registered window link. If this step is unsuccessful (no at step 525), then a default handler will be assigned for processing the event at step 526. At step 527, the message is forwarded to the window link handler. The window link handler, in turn, dispatches the message to the script engine at step 528. At this point, the script engine identifies the event by mapping the message into its set of known reserved words. At step 529, the script engine processes the message according to the instructions of the script (i.e., effects the action desired by the script writer, as indicated by the use of the matching reserve word). Upon completion of this step, the method has successfully dispatched the meta-message, with appropriate actions being effected in response to that message.

2. Building CBT Lessons

As a tutorial is designed, the CBT script writer creates a "storyboard" showing the visual appearance as well as the flow of the tutorial. The storyboard becomes the basis for the CBT lesson script.

CBT scripts are written in a simple language which contains both message handling and object-oriented features. Each lesson script is organized as a collection of scenes, with each scene describing the actions that take place at a particular point in the lesson. For example, a scene might instruct the CBT system to display a window containing some text when a particular menu item is chosen in the target application. As the lesson script proceeds, new scenes can be performed. This process continues until the user chooses to exit the CBT or the lesson is finished.

To control the target application, the CBT system intercepts all Windows events for the application and translates them into CBT messages. These messages will trigger any corresponding message handlers which are defined within a scene. When a message handler is triggered, its script is executed.

Within each scene, message handlers are defined for each UI control in the application which is of interest. For example, to respond to a button click within the script the following handler is defined:

```
script for Scene1
    TargetButton theButton(120)
    on theButton.buttonClick
        theCBTLesson.perform("Scene2")
    end
end
```

This hypothetical scene creates a TargetButton object which is linked to the UI control in the target application; the UI control Resource ID is 120. Next, a Message Handler is defined for the buttonClick message from the TargetButton object. When this message is received, the Script Engine performs a new scene, Scene2. Thus, the statement:

theCBTLesson.perform("Scene2")

calls the perform method of the global object "theCBTLesson" (the CBT Lesson object).

In addition to controlling user actions, the CBT lesson also drives the target application autonomously by sending appropriate messages. Alternatively a sequence of events can be recorded (e.g., using a tool similar to MS-Recorder) for later replay.

The script may also query the target application for its current properties. If a window link is established to a button, for instance, the script may query the button for its properties, such as its size, its title, and the like. One should note that the ability to query for properties operates independently of the processing of events and their messages. As another example, a target application could be asked to enumerate all the buttons of a dialog box. The script may, in turn, act on the queried information, including modifying selected resources. In this fashion, the resources of a target application may be dynamically varied, thereby providing the target application with an alternative user interface—one having UI components which may be altered on the fly.

Appended herewith as Appendix D is a source listing illustrating an exemplary script syntax and methodology for operating the CBT system of the present invention. Additional reference materials illustrating a preferred script syntax are appended herewith as Appendix E.

3. Multiple-application Lessons

As shown by FIG. 3, the system of the present invention is operative with one or more applications 360. More particularly, according to the present invention, a single script 320 may be employed to not only control multiple applications concurrently, but also control interaction between multiple applications. A script may be provided for tutoring the user in the operation of cutting and pasting between applications, for instance, cutting text from a word processor and pasting it into a database application. Thus, the CBT system 130 is not application bound; instead, it is a complete subsystem—one which may control multiple applications, including interactions between applications and/or the operating system, even launching additional applications as needed.

4. Event Information (EventInfo) Objects

Figure 5C:
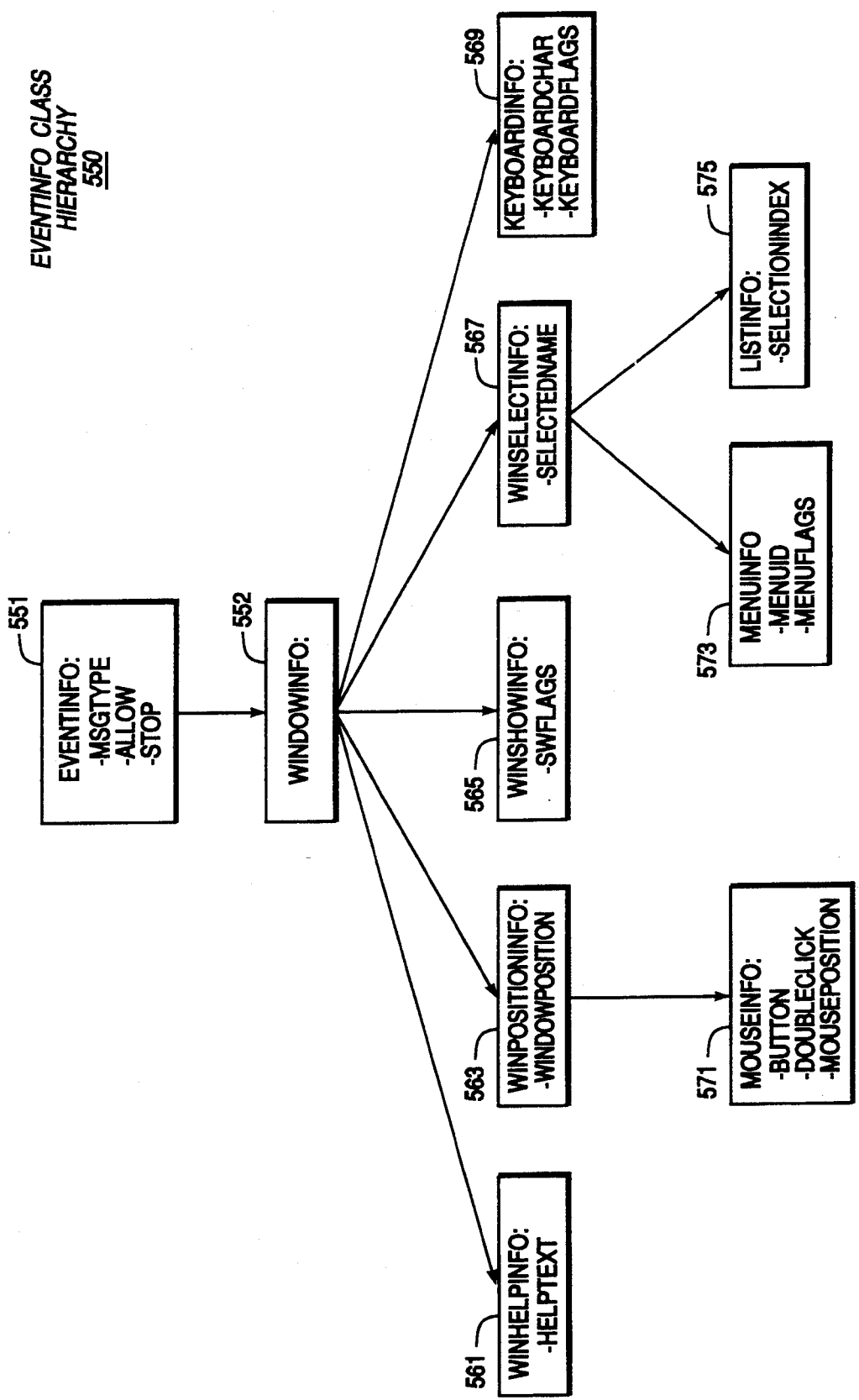
FIG. 5C is a class hierarchy diagram illustrating the underlying structure for the EventInfo objects of FIG. 5A.

An EventInfo object, which stores information about a particular event, is instantiated from an EventInfo class 550. FIG. 5C illustrates the EventInfo inheritance tree and lists the properties for each class. As shown, the EventInfo class hierarchy 550 includes nine derived EventInfo classes which contain the state information about the various standard CBT messages. At the root of the hierarchy is the EventInfo base class 551. In a preferred embodiment, this class may be constructed with the following C++ class definition:

```
class SHARED_CLASS EventInfo:    public CbtObject,
                                 public pEventInfo {
public:
        ATOMTABLES(Keyword, 7)
protected:
        HWND      hwndTarget;
        BOOL      bAllowMsg;
        BOOL      bIsProcessing;
public:
                                    EventInfo(HWND hwnd);
        virtual                     ~EventInfo( );
        virtual      int            Supports(hProtocol &Hd1) const;
        inline       HWND           WindowHandle( ) const;
        virtual      const char *   WindowName( )    const = 0;
        virtual      const char *   WindowClass( )   const = 0;
        virtual      int            WindowId( )      const = 0;
        virtual      LONG           WindowStyle( )   const = 0;
        virtual      BOOL           Allow Message(BOOL bFlag, BOOL bState);
        virtual      BOOL           ProcessingMsg( ) const;
        virtual      void           Finished( );
        inline       void *         operator new(unsigned size);
        inline       void           operator delete(void *p);
        ATOMMETHODS(Keyword)
        CLASSMETHODS(EventInfo, "EVENTINFO")
};
```

As shown, the EventInfo class 551 provides access to the Windows name and its class, its resource ID, its Windows style, and whether the message is allowed (according to the script 320).

Derived from EventInfo class 551 is WindowInfo class 552, a pure virtual base class for other EventInfo classes. The subclass affords the same four pieces of information which were provided by the base class 551. In addition, for a given window handle, the object will extract a window name, class, ID, and style. The class may be constructed with the following C++ class definition:

```
class SHARED_CLASS WindowInfo : public EventInfo {
protected:
        int       iWindowId;
        LONG      lWindowStyle;
        char *    strWindowName;
        char *    strWindowClass;
public:
                                    WindowInfo(HWND hWnd);
        virtual                     ~WindowInfo( );
        virtual      int            Supports(hProtocol &Hd1) const;
        virtual      const char *   WindowName( )    const;
        virtual      const char *   WindowClass( )   const;
        virtual      int            WindowId( )      const;
        virtual      LONG           WindowStyle( )   const;
        CLASSMETHODS(WindowInfo, "WINDOWINFO")
};
```

In addition to the windowing information, other events are also of interest, particularly mouse and keyboard events. These other events are accessible through subclasses of WindowInfo class 552. Specifically, the WindowInfo class spawns five subclasses: WinHelpInfo class 561, WinPositionInfo class 563, WinShowInfo class 565, WinSelectInfo class 567, and KeyboardInfo class 569. As shown, objects may be instantiated from these subclasses for accessing help text, window position, menu information, keyboard events, and the like. WinHelpInfo, for instance, contains the text which was sent by the WinHelp engine to the CBT. This text can be a sequence of script statements which are executed or simply a string of text. WinPosition provides the coordinates of the window. WinShowInfo contains the SWP_flags corresponding to the Windows ShowWindow() function. WinSelectInfo contains the name of the selected menu or control window item. KeyboardInfo contains the key that was pressed as well as any flags indicating if the <ALT>, <SHIFT>, or <CTRL> keys were also pressed.

Two classes, WinPositionInfo class 563 and WinSelectInfo class 567, spawn additional subclasses. As shown, MouseInfo class 571, which is derived from WinPositionInfo class 563, provides direct access to mouse events; it contains the mouse button that was clicked and whether it was a single or double click as well as the position of the mouse. WinSelectInfo class 567, on the other hand, spawns MenuInfo class 573 and ListInfo class 575. The former provides access to menu IDs and menu flags, the flags indicating whether the menu item is grayed, highlighted, or the like; the latter provides the index of the selected item, which is important if the list does not contain text.

5. Information Continuum

Figure 6A:
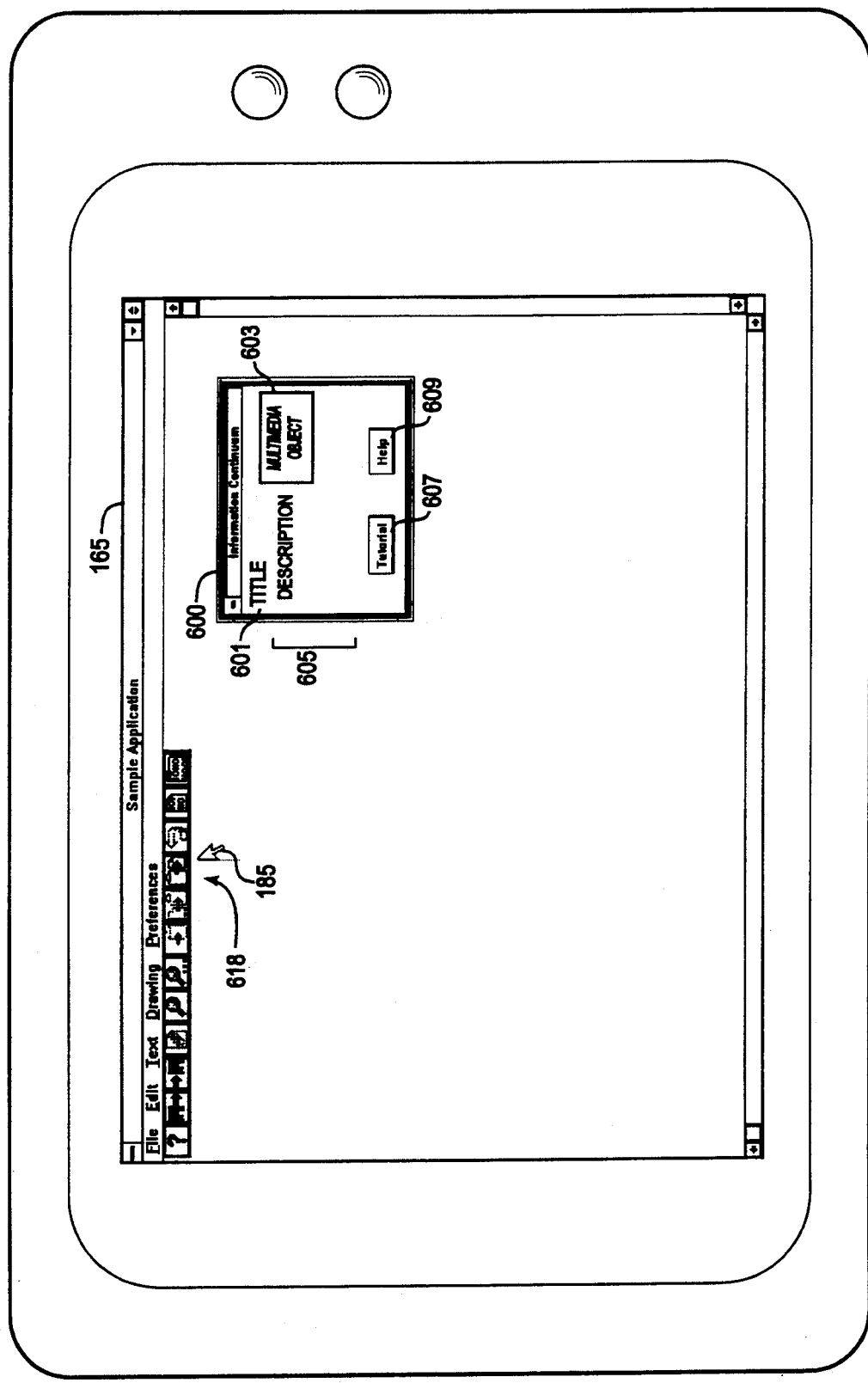
FIG. 6A is a screenshot bitmap illustrating an information continuum interface of the present invention.
Figure 6B:
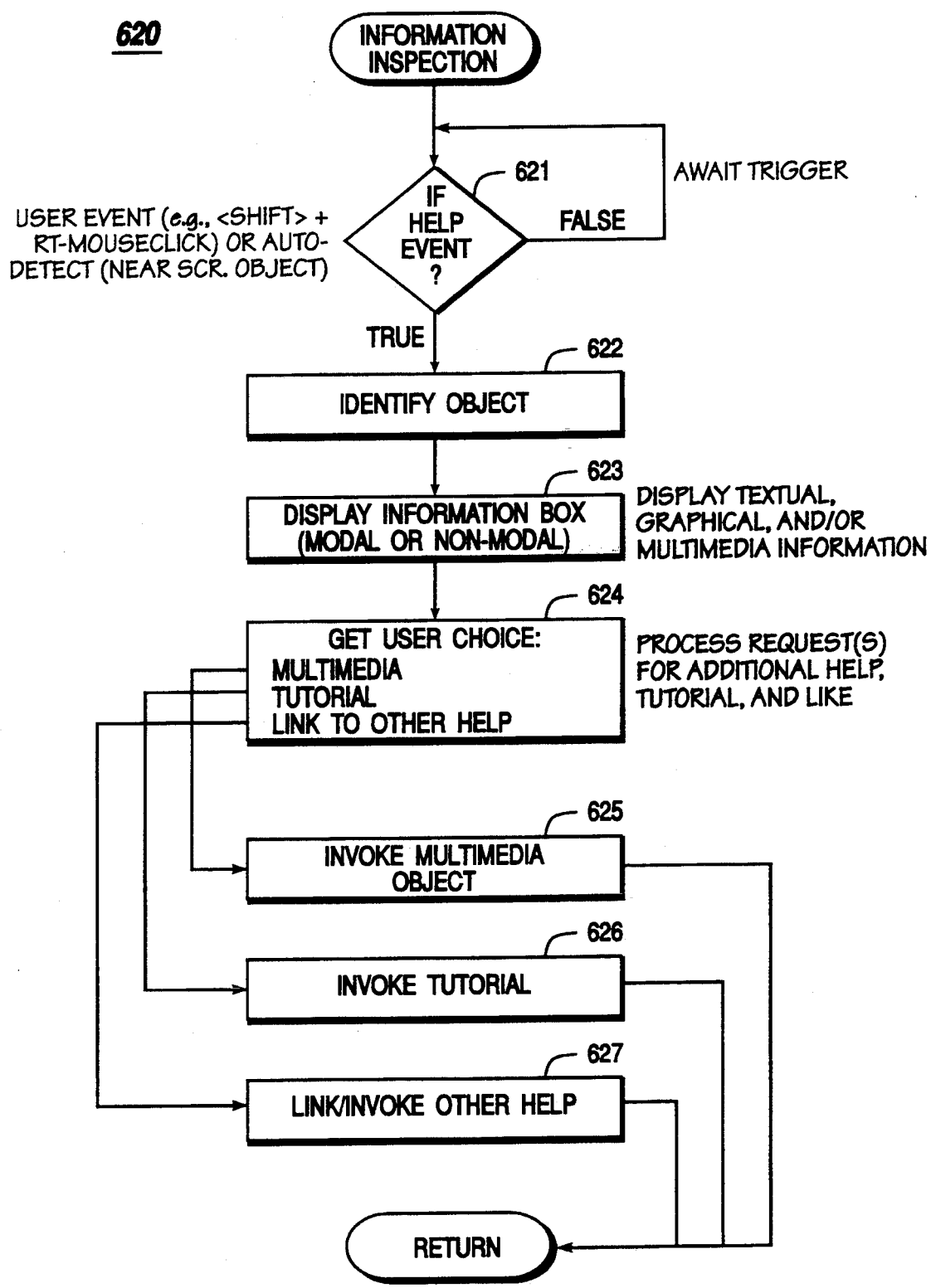
FIG. 6B is a flowchart illustrating a method of the present invention for information inspection, using the information continuum interface of FIG. 6A.

Referring now to FIGS. 6A-B, an improved interface and method of the present invention for providing help and tutorials are illustrated. As shown in FIG. 6A, the monitor device 106 displays the GUI window 165; contained within window 165 are various screen objects, many of which the user may know nothing about. For instance, window 165 includes a "toolbar" 618 which, in turn, includes a plurality of screen buttons.

As described above in FIG. 3, CBT system 300 includes one or more CBT window objects (e.g., window object 370 of FIG. 3), which are CBT UI components that may be simultaneously displayed with a target application's interface. Thus, while the CBT system preserves the interface of the target application(s), the script writer may also extend the interface with his or her own UI components. Moreover, these components are fully extensible as one may dynamically link one's own libraries to the system using known DLL technique (for additional description of DLL techniques, see the above-referenced Microsoft Windows SDK).

In a preferred embodiment, an information continuum window object or interface 600 is provided when the screen cursor 185 is in proximity to a screen object of interest in a target application. This action may be triggered automatically, such as when the cursor approaches a minimum distance from the screen object of interest. Alternatively, interface 600 may appear in response to a user event; in a preferred embodiment, the information continuum interface is triggered in response to a <Shift> right mouse button click action. Upon invocation, interface 600 provides help information inspection for the object of interest (i.e., the screen object closest to the cursor 185).

Interface 600 itself is a window object including various help components. Specifically, interface 600 includes a title 601, multimedia objects 603, description field 605, tutorial object 607, and help object 609. Each of these will be explained in turn. Title 601 is a short text string describing what help information is currently being inspected (e.g., "footnote help"). Description field 605 provides textual and/or graphic help information for assisting the user in understanding the current screen object whose help information is desired. Multimedia object 603, on the other hand, includes any multimedia data desired for the screen object. Multimedia object 603, for example, may play a short film clip illustrating how the current screen object is used.

Interface 600 also includes links to tutorial and help modules. Specifically, tutorial component 607 may be triggered by the user (e.g., by a mouse click) for launching a full tutorial on the current screen object of interest. Upon invocation of the help component 609, on the other hand, the interface 600 displays help links which are relevant to the current object being inspected. In this manner, the user may rapidly traverse an information hierarchy which is relevant to the current object. All told, the interface 600 provides an information continuum for immediate and automatic access to all help and tutorial information which is of current interest to the user.

Referring now to FIG. 6B, an information inspection method 620 in accordance with the present invention will be described. In step 621, an event loop is established to await a trigger for help. In a preferred embodiment of the method, a user event serves as a trigger. Alternatively, the step may be triggered automatically, for example, in response to movements of the cursor towards an object of interest. At step 622, the screen object of interest (typically, that which is closest to the cursor 185 of FIG. 6A) is identified using known technique (e.g., within preset hit radius of cursor 185). At step 623, the method displays an information continuum box, which may either be modal or non-modal (as desired by the system designer). At step 624 the user may traverse other components of the help continuum or hierarchy. Using a pointing device (device 105 of FIG. 1A), for example, the user may invoke the multimedia object at step 625, a tutorial at step 626, and/or additional help information at step 627. Upon exiting the information continuum dialog, the method may conclude or reenter the event loop of step 621.

While the invention is described in some detail with specific reference to a single preferred embodiment and certain alternatives, there is no intent to limit the invention to that particular embodiment or those specific alternatives. For example, the foregoing description of the EventInfo class hierarchy 550 has focused on the Microsoft Windows environment; those skilled in the art will appreciate, however, that the individual classes may be adapted for other platforms, including, for example, OS/2, NeXTStep, X-Windows, and the like.

Moreover, the class hierarchy, through the use of virtually-defined methods, includes extensibility for accommodating specific application environments. Classes may be defined for a spreadsheet which handle, for example, specific spreadsheet events. From the broad class of spreadsheet events, subtypes may be derived for processing specific types of user activities. For example, a class may be defined for processing spreadsheet "cell" events which would include such activities as editing a cell, formatting a cell, deleting a cell, and the like. Thus, the true scope of the present invention is not limited to any one of the foregoing exemplary embodiments but is instead defined by the following claims.

Appendix A.    Exemplary CBT Messages

1) menuSelect:

- Sent when an item is highlighted in a pulldown menu.

- Translates WM_MENUSELECT events.

2) menuChoose:

- Sent when an item is chosen from the menubar.

- Translates WM_COMMAND events caused by menu items.

3) windowActivate:

- Sent when a window is about to become active.

- Translates HCBT_MOVE events within the CBT hook.

4) windowMove:

- Sent when a window is about to be moved.

- Translates HCBT_MOVE events within the CBT hook.

5) windowShow:

- Sent when a window is about to be minimized, maximized or restored.

- Translates HCBT_MINMAX events within the CBT hook.

6) windowClose:

- Sent when a window is about to be closed.

- Translates WM_CLOSE events.

7) mouseEnter:

- Sent when the mouse pointer enters a window.

- Performs hit-testing during WM_SETFOCUS events.

8) mouseLeave:

- Sent when the mouse pointer leaves a Window.

- Generated at the same time as the mouseEnter message. It is dispatched to the window that received the previous mouseEnter message.

9) mouseClick:

- Sent when a mouse button is clicked or double clicked.

- Translates WM_{NC} {L, R}BUTTONDOWN and BUTTONDBLCLK events.

10) anyEvent:

- Sent when any other CBT message is received, but no corresponding script module is defined. This is the default message for each handler.

11) applicationClose:

- Sent when the application is about to terminate.

- Translates WM_CLOSE event.

12) winHelpMessage:

- Sent when the Windows 3.1 help engine sends information to the CBT system.

- This message is generated when WinHelp calls a public function within the Message Engine.

13) editEnter:

- Sent when an Editbox is about to receive the input focus.

- Translates HCBT_SETFOCUS events within the CBT hook.

14) editLeave:

- Sent when an Editbox is about to lose the input focus.

- Translates HCBT_SETFOCUS events within the CBT hook.

15) editChar:

- Sent for each keystroke typed within an Editbox.

- Translates WM_CHAR events.

16) listboxEnter:

- Sent when a Listbox is about to receive the input focus.

- Translates HCBT_SETFOCUS events within the CBT hook.

17) listboxLeave:

- Sent when a Listbox is about to lose the input focus.

- Translates HCBT_SETFOCUS events within the CBT hook.

18) listboxSelect:

- Sent when an item in a Listbox is selected.

- Translates WM_COMMAND events where wParam ==
LBN_SELCHANGE 19) listboxDblClick:

- Sent when an item in a Listbox is double clicked.

- Translates WM_LBUTTONDBLCLK events within the Listbox.

20) comboEnter:

- Sent when a Combobox is about to receive the input focus.

- Translates HCBT_SETFOCUS events within the CBT hook.

21) comboLeave:

- Sent when a Combobox is about to lose the input focus.

- Translates HCBT_SETFOCUS events within the CBT hook.

22) comboChar:

- Sent for each keystroke entered within a Combobox.

- Translates WM_CHAR events.

23) comboSelect:

- Sent when an item in a Combobox is selected.

- Translates WM_COMMAND events where wParam ==
CBN_SELCHANGE.

24) comboDblClick:

- Sent when an item in a Combobox is double clicked.

- Translates WM_LBUTTONDBLCLK events within the Combobox.

25) buttonEnter:

- Sent when a Button is about to receive the input focus.
- Translates HCBT_SETFOCUS events within the CBT hook.

26) buttonLeave:

- Sent when a Button is about to lose the input focus.
- Translates HCBT_SETFOCUS events within the CBT hook.

27) buttonClick:

- Sent when a Button is clicked.
- Translates WM_COMMAND events where wParam == BN_CLICKED.

28) scrollEnter:

- Sent when a Scrollbar is about to receive the input focus.
- Translates HCBT_SETFOCUS events within the CBT hook.

29) scrollLeave:

- Sent when a Scrollbar is about to lose the input focus.
- Translates HCBT_SETFOCUS events within the CBT hook.

Appendix B. Exemplary CBT Message Handlers:

| Message Handler Class | Message Name | Message Type | EventInfo Object |
|---|---|---|---|
| *Target Window:* | - menuSelect | Notify | MenuInfo |
| | - menuChoose | Confirm | MenuInfo |
| | - windowActivate | Confirm | WindowInfo |
| | - windowMove | Confirm | WinPositionInfo |
| | - windowShow | Confirm | WinShowInfo |
| | - windowClose | Confirm | WindowInfo |
| | - mouseEnter | Notify | MouseInfo |
| | - mouseLeave | Notify | MouseInfo |
| | - mouseClick | Confirm | MouseInfo |
| | - anyEvent | Confirm | WindowInfo |
| *Target Application:* | - applicationClose | Confirm | WindowInfo |
| *TargetWinHelp:* | - winHelpMessage | Notify | WinHelpInfo |
| *TargetEditbox:* | - editEnter | Confirm | WindowInfo |
| | - editLeave | Confirm | WindowInfo |
| | - editChar | Confirm | KeyboardInfo |
| *TargetListbox:* | - listboxEnter | Confirm | WindowInfo |
| | - listboxLeave | Confirm | WindowInfo |
| | - listboxSelect | Notify | ListInfo |
| | - listboxDblClick | Confirm | ListInfo |
| *TargetComboBox:* | - comboEnter | Confirm | WindowInfo |
| | - comboLeave | Confirm | WindowInfo |
| | - comboChar | Confirm | KeyboardInfo |
| | - comboSelect | Notify | ListInfo |
| | - comboDblClick | Confirm | ListInfo |
| *TargetButton:* | - buttonEnter | Confirm | WindowInfo |
| | - buttonLeave | Confirm | WindowInfo |
| | - buttonClick | Confirm | WindowInfo |
| *TargetScrollbar:* | - scrollEnter | Confirm | WindowInfo |
| | - scrollLeave | Confirm | WindowInfo |

Appendix C. Message Handler Properties

| Message Handler Class | Property Name | Description |
|---|---|---|
| *Target Window:* | - Name<br>- Class<br>- ID<br>- Style<br>- Enable<br>- Position<br>- EventInfo | Title string of the control.<br>Windows class of the control.<br>Resource ID of the control.<br>Style flags of the control.<br>Whether the control is enabled.<br>Coordinates of the control<br>Current EventInfo object (if any) |
| *Target Application:* | - Show | How the application is displayed. |
| *TargetWinHelp:* | - Text | Text sent from or to WinHelp. |
| *TargetEditbox:* | - EditText | Text contained in the Editbox |
| *TargetListbox:* | - SelectionIndex<br><br>- SelectedString | Index of the selected item in the Listbox.<br>String which is currently selected in the Listbox. This is valid only if the Listbox contains strings. |
| *ComboBox:* | - EditText<br><br>- SelectionIndex<br><br>- SelectionText | Text contained in the Combobox edit field.<br>Index of the selected item in the Combobox list.<br>String which is currently selected in the Combobox. This is valid only if the Combobox contains strings. |
| *TargetScrollbar:* | - ScrollValue | Current position of the scrollbar thumb. |

Appendix D: A Sample Lesson Script:

The following CBT lesson illustrates a sample ObjectVision® tutorial.

lesson "OVDemo"

script for "Initialization"

```
//
// Create a message handler for the target application.
// Create a Bitmap Interaction window
// Create a dialog box control window
//
        TargetApplication OVApp("ObjectVision")
        BitmapWindow theBitmapWnd()
        ControlWindow  theControlWnd(100)

//
// Set up a global message handler for the EXIT
// button on the CBT Control window...
// on theControlWnd.exitButton
                theCbtLesson.exit
        end end script for "Scene0"
//
// Disable the target application.  When the app is disabled no
// events are dispatched to the CBT
//
        OVApp.disable //
// When the Next button in the control dialog box is pressed,
// show the target application, show the first bitmap and
// goto the next scene
```

```
//
        on theControlWnd.nextButton
                OVApp.activate(SW_SHOWNORMAL)
                theBitmapWnd.show("BMP_1")
                theCbtLesson.perform("Scene1")
        end
end script for "Scene1"
//
// When the Next button in the control dialog box is pressed,
// enable and maximize the target application, show the next
// bitmap and goto the next scene.
// Remember, the application is still disabled so we don't
// need to worry about messages from it.
//
        on theControlWnd.nextButton
                OVApp.enable
                OVApp.activate(SW_MAXIMIZE)
                theCbtLesson.perform("Scene2")
        end
end script for "Scene2"

//
// Show the bitmap for the second scene...
//
        theBitmapWnd.show("BMP_2")

//
// If the target application is about to close, stop the message
//
        on OVApp.close
                OVApp.stopMessage
        end
//
// Stop all right mouse button clicks since these will bring up
// a property inspector.
//
```

```
on OVApp.mouseClick
    if( OVApp.eventInfo.isRightButton )
        OVApp.stopMessage
    end
end
```

//
// *If one of the Properties | Object menu items is chosen,*
// *then show the appropriate bitmap and goto the next*
// *scene...*
// *Otherwise, stop the message...*
//

```
on OVApp.menuChoose isValidChoice = 0 if( OVApp.eventInfo.menuId == 69 )
        theBitmapWmd.show("BMP_31")
        isValidChoice = 1
    end if( OVApp.eventInfo.menuId == 52 )
        theBitmapWnd.show("BMP_32")
        isValidChoice = 1
    end if( OVApp.enventInfo.menuId == 53 )
        theBitmapWnd.show("BMP_33")
        isValidChoice = 1
    end .   //
        .   // This continues for each menu item of interest.
        .   // if( isValidChoice == 0 )
        OVApp.stopMessage
        theCbtLesson.perform("SceneError")
    end
```

```
                if( isValidChoice == 1 )
                        theCbtLesson.perform("Scene3")
                end
        end
end script for "Scene3"
//
// Create message handlers for the OK and Cancel buttons in
// the dialog box in the target application.
//
        TargetButton theOKBtn(1)
        TargetButton theCancelBtn(2)

//
// If either of theses buttons is pressed, then
// go back to scene 2.
//
        on theCancelBtn.buttonClick
                theCbtLesson.perform("Scene2")
        end on theOKBtn.buttonClick
                theCbtLesson.perform("Scene2")
        end end script for "SceneError"

//
// Show the error screen and wait for the
// user to do anything in the target application.
//
        theBitmapWnd.show("BMP_ERR")

on OVApp.anyEvent
                OVApp.stopMessage
                theCbtLesson.perform("Scene2")
        end
    end end     // lesson
```

Appendix E. Preferred script syntax

Document Conventions

The following document conventions are used:

| | |
|---|---|
| Bold Text | Bold text is used for section headings, syntax and command statements, and emphasis in normal text. |
| *Italic Text* | Words in italics indicate a placeholder in command and syntax statements; you are expected to provide the actual value. |
| ( ) | In syntax statements, parentheses enclose one or more parameters that you pass to a function. |
| < > | Angle Brackets enclose optional fields or parameters in command lines and syntax statements. |
| " " | Quotations enclose text strings in command lines and syntax statements. |
| `Courier` | Script and immediate mode examples are displayed using the Courier font. |

Orientation

Most products' CBT tutorials are built as stand-alone applications. These tutorials simulate the look and feel of the application with screen captured bitmaps and hypergraphics. This approach has several disadvantages. The process of creating and assembling these bitmaps and graphics to simulate the application is labor intensive. Because the structure of these types of materials is static, changes in the look of an application may require difficult and costly changes to the associated training materials. Internationalization faces a similar dilemma.

The major advantage of the CBT Presentation System is that it runs on top of the actual application product and interacts with the live application and real application data. These tutorials can be more interactive than the "canned slide shows" that ship with most applications. Because tutorials have access to Windows events such as mouse movements, keyboard events and mouse clicks, tutorials can be true to the actual look and feel of the application, and lessons can actually use and manipulate the user's environment and data.

Also, since work written using the Presentation System will utilize the live application, and not just screen shots, subtle changes in the look of an application during development are less likely to require rework.

Finally, since the Presentation System allows the use of external resources, modifications such as translations of lesson text in string tables can be made easily and with minimal impact to other lesson resources.

The Oxford ClassRoom is very text based. The look and flow of a CBT lesson is controlled by scripts written in a text editor. Tools external to the OXFORD ClassRoom are used to create and edit the resources (bitmaps, string tables, etc.) used by these scripts. As the OXFORD ClassRoom matures, more visual and more integrated tools will become available.

In lieu of a more integrated environment, CBT Authors have several stand-alone tools available to them for designing and implementing training materials. Resources such as bitmaps, metafile graphics, string tables, and sound files can be developed using Borland's Resource Workshop, Window's Sound Recorder, etc. These graphics and sound objects are displayed or played to the user during tutorials designed using the LUCY scripting language.

Oxford ClassRoom

Immediate Mode

Your first experience with the Oxford ClassRoom will probably be in immediate mode. LUCY has been designed to be an interactive language, and the OXFORD ClassRoom allows users to get immediate feedback. As a result, the ClassRoom allows for lots of experimentation.

The best way to become familiar with the OXFORD ClassRoom is to launch it and get started. To start, run oxford from Windows. What you should see is a window with a blinking cursor, a Menu Bar, and SpeedBar. You may type at the blinking cursor on the OXFORD ClassRoom White Board. Try typing print "hello world!" and hit Enter. The White Board will immediately respond with *hello world!*. The LUCY command print "<*text*>" will print the text string defined between the double quotes to the ClassRoom White Board.

Now type x = 3 and hit Enter. This line performs two very important operations. First, the statement defines a container or variable named x. Second, the command stores a 3 in (or assigned a 3 to) the variable x and in doing so declares that x will take on the characteristics of a number. Any operation you can perform with a number you can now do with x. Try printing x (print x). Try printing x plus 4 (print x+4). Try adding 5 to x and printing out the new value (first x = x + 5 and Enter, then print x). x has taken on all the characteristics of a container or variable of the number type. There are other types in LUCY; they will be discussed in later sections. The point here is for you to see that the type of a variable defined in LUCY is dependent on how you use the variable. For example, now type x = "Hello Oxford!" and print x. OXFORD responds by printing *Hello Oxford!* on the ClassRoom White Board. In assigning a string to the variable x, we have changed its type to string and changed the operations that can be performed on the variable.

Scripts

Although there are times while writing CBT that the interactive nature of the OXFORD ClassRoom will be very useful, we will use the scripting capabilities of the OXFORD ClassRoom for authoring CBT.

The commands that you type to the OXFORD ClassRoom may be typed in any text editor, saved as a text file (by convention with the extension .scr), and loaded and run by the OXFORD ClassRoom. For example, in your favorite editor, type the following lines of text:

```
print "hello world!"
x = 4
print x
```

Now launch oxford. Select the menu item FILE and LOAD/RUN, and in the dialog box that follows find your file and select it. When you do, the OXFORD ClassRoom White Board will display:

```
hello world!
4
```

The OXFORD ClassRoom has loaded and run your text file as though an interactive user typed in each line of script, line by line. Notice that the actual line is not typed on the White Board, only the results of each line are displayed. This does not mean that x=4 was not executed; it's just that assignment statements such as x=4 have no visual effects.

Menu Bar

The OXFORD ClassRoom Menu Bar offers commands to manage and debug scripts, and manipulate the ClassRoom White Board.

File

Click and hold the mouse down on File on the Menu Bar for the following options:

Open

Open a script for editing.

When File|Open is selected, a Edit Script Dialog box appears, enabling the user to navigate the file system and select a file or specify a group of files for editing. Select a file, click OK and OXFORD will launch an editor window. Wild cards may be supplied for the File Name to load multiple files as multiple buffers in a single editor window. (Selecting multiple files using the CNTL or SHIFT keys with the mouse is not possible.) Selecting File|Open a second time, while an OXFORD edit window is running, will launch a second OXFORD editor window.

Choosing File|Open loads an editor of your choice. You option is stored in the OXFORD.INI file in your WINDOWS directory. The default editor is BRIEF. (If you are using BRIEF, you may find it necessary to delete the Start-up Directory in B.PIF for OXFORD to find and load script files successfully.)

Load/Run

Load and Run a script.

When File|Load/Run is selected, a Run Script Dialog box appears, enabling the user to navigate the file system and select a script file to load and run. Once a script is run from the ClassRoom, it remains loaded with all its functions, handlers, variables, and constants defined and active until the session is cleared.

Stop Script

Stop the current script from running.

Clear Session

Unload all loaded user scripts (including the handlers defined in the scripts).

LIBRARY.SCR remains loaded. Note there is no confirmation.

Save Settings

Saves the current OXFORD ClassRoom size and screen position. Saves the current Trace settings.

Exit

Unloads all scripts and quits the OXFORD ClassRoom.

Edit

Click and hold the mouse down on Edit on the Menu Bar for the following options:

Cut

Cuts the selected OXFORD ClassRoom White Board text and places it in the clipboard.

Copy

Copies the selected OXFORD ClassRoom White Board text and places it in the clipboard.

Paste

Pastes the clipboard text to the OXFORD ClassRoom White Board beginning at the current position of the cursor.

Search

Search for a text string in the OXFORD ClassRoom White Board.

When Edit|Search is selected, a Text Search Dialog box appears and requests text to search for in the OXFORD ClassRoom White Board. As text is entered character by character, OXFORD searches the OXFORD ClassRoom White Board beginning at the current cursor position and working backwards, highlighting the most recent text string that matches the entered text. If the system cannot find the text string as it is typed in the Text Search Dialog, then no text is highlighted. Clicking on the Find button in the Text Search Dialog will find the next most recent occurrence of the requested text string. When the search has reached the top of the OXFORD ClassRoom White Board text, the search will wrap around to the most recent text at the bottom. If text is selected before Edit|Search is selected, OXFORD will automatically load the selected text into the Text Search Dialog.

Debug

Click and hold the mouse down on Debug on the Menu Bar for the following options:

Inspect

Creates an Object Inspector. A user may type an object or variable identifier name in the Inspector's edit box (and Enter). If a variable or object's property has been entered, the Inspector will display the current value of the variable or property. If the an object has been entered, the Inspector will display the properties that apply to that object's class, as well as the current values of that object's properties.

A short cut, rather than chosing the Debug|Inspect menu option, is a right mouse click. A single right mouse click will create an Inspector.

If text on the ClassRoom White Board is selected and an Object Inspector is requested (either using the menu or mouse), the selected is automatically entered into the Inspector's edit box. To select an object or variable you may drag across it, or double left mouse click somewhere on the object's string.

Once an Inspector is displayed with object's properties and values, you may double left mouse click on an object's property in the Object Inspector to create a separate Inspector for that particular property.

The Edit Box in the Inspector behaves much like the ClassRoom White Board. You may type any command you'd type on the White Board and get the same result; therefore, you change change an object's properties by typing commands to its Object Inspector.

Note that Inspectors are not "watch windows", they are not updated whenever an object's properties are changed. To get a current update, you must issue a carriage return in the object's Inspector Edit Box.

Trace To Screen

Selecting Trace To Screen toggles the display of trace messages on the ClassRoom White Board. File|Save Settings will save the current state of trace messages for subsequent OXFORD ClassRoom sessions.

Help

Click and hold the mouse down on Help on the Menu Bar for the following options:

About

About the OXFORD ClassRoom, including the version number of the ClassRoom being executed.

SpeedBar

SpeedBar™ provides the following short cuts:

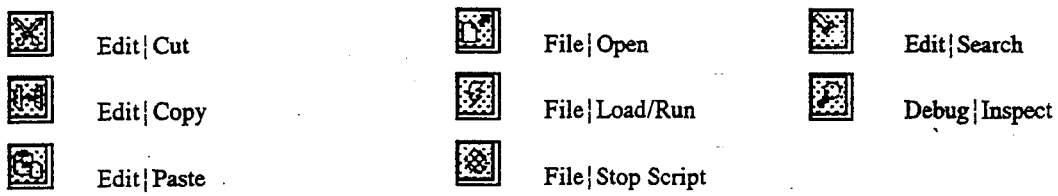

| | | |
|---|---|---|
| Edit\|Cut | File\|Open | Edit\|Search |
| Edit\|Copy | File\|Load/Run | Debug\|Inspect |
| Edit\|Paste | File\|Stop Script | |

OXFORD.INI

OXFORD stores settings and preferences for the OXFORD window screen position, editor preference, and other options in an OXFORD.INI file in your WINDOWS directory. When you start OXFORD, it reads the OXFORD.INI file and uses the settings that were in effect at the end of the last Windows session. If OXFORD.INI does not exist, OXFORD will create the file with the default settings.

The first line of OXFORD.INI is a header, oxford enclosed in square brackets. The options that follow may appear in any order. Although most of the options in OXFORD.INI may be updated using OXFORD, this file can be modified with a text editor. See the explanations below for directions on how to store your new settings and preferences.

| Option | Explanation |
|---|---|
| Trace=*boolean* | Example: Trace=F - Sets the printing of LUCY Trace Messages on the OXFORD ClassRoom White Board. "T" to display Tracing on the White Board; "F" to suppress Tracing Messages. This flag is updated in OXFORD.INI whenever the File\|Save Settings menu item is chosen. |
| Left=*n* | Example: Left=0 - Sets the vertical position of the left side of the OXFORD window, in pixels, where the left side of the screen is zero (0). (Specifies the x-coordinate of the upper left corner of the OXFORD |

ClassRoom.) This attribute is updated in OXFORD.INI whenever the File|Save Settings menu item is chosen.

Top=*n*

Example: Top=0 - Sets the horizontal position of the top of the OXFORD window, in pixels, where the top of the screen equals zero (0). (Specifies the y-coordinate of the upper left corner of the OXFORD window.) This attribute is updated in OXFORD.INI whenever the File|Save Settings menu item is chosen.

Width=*n*

Example: Width=491- Sets the width of the OXFORD window in pixels. This attribute is updated in OXFORD.INI whenever the File|Save Settings menu item is chosen.

Height=*n*

Example: Height=364 - Sets the height of the OXFORD window in pixels. This attribute is updated in OXFORD.INI whenever the File|Save Settings menu item is chosen.

Startup=*filename*

Example: Startup=library.scr - Notifies OXFORD to load and run the specified script when OXFORD is launched. The default script is LIBRARY.SCR. The default directory if no path is specified is the directory where OXFORD.EXE resides. This option can be changed by modifying the OXFORD.INI with a text editor.

EditorPath=*path*

Example: EditorPath=C:\OXFORD\SCRIPTS\OV - Sets the Edit and Load/Run browser in OXFORD to the specified path. This option is updated when you quit OXFORD.

Editor=*EditorName*

Example: Editor=notepad - Specifies the editor OXFORD opens when the user choses FILE|OPEN. The default editor is BRIEF.

LIBRARY.SCR

When OXFORD is launched, the script specified in the OXFORD.INI file as the start-up script is always loaded and run. Typically this script contains commands used to set up external links to libraries or definitions of local macros, class, objects, or variables used by all the scripts in the subsequent session.

For CBT Presentation, the start-up script LIBRARY.SCR has been developed with definitions useful for CBT authoring. Different versions of LIBRARY.SCR may exist. To be sure that the OXFORD ClassRoom is running the LIBRARY.SCR you expect, verify that the correct version resides in the same directory as OXFORD and that the OXFORD.INI file in your WINDOWS directory specifies the correct start-up script. (LIBRARY.SCR is the default and will be automatically loaded the first time you run OXFORD if no OXFORD.INI exists.) When LIBRARY.SCR has been loaded and has completed running, Library Script Version x.x will appear in the OXFORD ClassRoom White Board.

Script Language

Classes, Objects, Methods and Properties

The script language LUCY borrows much of it capability and syntax from both C++ and dBase -- you can think of LUCY as an object-oriented dBase. The most important concept of object oriented programming to understand for simple LUCY and CBT script writing is the idea of encapsulation.

If you've done any programming you've probably at some time defined a variable or container for some information. This variable probably also had some procedures or operations associated with it. For example you might have defined a counter, and then procedures to increment, decrement, and clear the counter. Encapsulation takes the data definition (the counter) and the procedures associated with the data (increment, decrement, clear), and combines them into a class. Every class has procedures or methods (sometimes called member functions), and characteristics or properties.

For example, we can think of car as a class. Methods of the car class might include a start method, an accelerate method, a turn method, a brake method, and a stop method. Properties of car might be color, make, model, direction, speed, and mileage. When we create a car with a particular make and model, we are instantiating or creating an instance of a car; we are creating an object. The object in this case has all the properties and methods associated with the car class. When we create the car we use a constructor to build the car and specify the cars initial characteristics.

In certain cases, we may make our own changes to a particular object's methods; we may redefine or overload the method defined for the class. To use our example of the car class, let's say the class comes with a "play radio" method that plays only an AM radio. We might install our own AM/FM cassette radio and redefine the "play radio" method to play our new sound system.

As an author using LUCY and the CBT Library, you will be able to construct objects that are windows. The CBT Library contains a class called WINDOW. Using a constructor you will be able to create or instantiate WINDOW objects that have properties such as size, style, and text with certain attributes. There is a method in the WINDOW class that enables us to draw an arrow from a WINDOW object to another window; and there are methods we will overload in order to read mouse events that occur in WINDOW objects.

One final note before beginning to learn about LUCY: there is a difference between a variable and an object. Remember, a variable is just data. You may be able to store and retrieve information from a variable, but it is very different from an object. Objects are like little black boxes. We access objects through their properties and methods. Their internals are hidden from us.

Lucy

The Basic Syntax

Comments

Lucy supports two comment styles: // and /* */. For example:

```
// Initialize the counter
t = 10
/* Start the loop */
while t < 25
      t = t + 1     // Increment the counter
end /* while */
```

Characters to the left of //, and in between /* and */ are ignored by the LUCY Interpreter.

Statements

Statements in LUCY must be separated by a new line, or a semicolon (;). The semicolon allows multiple statements per line.

Variables

Two formal types of variables are available in LUCY: numeric and string.

Numeric Types

You can create a number type by simply assigning an id a number. For example:

```
b = 4
print b
```

The first line, the assignment statement, defines the variable b and stores the 4. The second line prints the contents of the variable b.

String Types

You can create a string variable by simply assigning an id a character string. For example:

```
c = "I love Lucy!"
print c
```

The first line, the assignment statement, defines the variable c and stores the character string. The second line prints I love Lucy!

Boolean Types

There is no explicit boolean type in LUCY, but the dBase keywords .t. (true) and .f. (false) do exist and can be assigned to variables. The variable that is created when you assign an id .t. is actually a number. (In LUCY, .t. is equivalent to -1 and .f. is equivalent to 0) For example:

```
done = .f.         // create done equal to false
print done         // prints 0 to the White Board
done = .t.         // set done equal to true
print done         // prints -1 to the White Board
```

NULL

NULL is a special value that can be assigned to variables. It means the variable is empty and is of no particular type.

Functions

```
function FunctionName (<parameter(s)>)
statement(s)
<return value>              // optionally function may
                            // return a value
end
```

Classes

```
class ClassName
      <function method1 (arguments) {
             :
         end>
      <function method2 (arguments) {
             :
         end>
      end
```

Objects

```
ClassName    ObjectName ( ConstructorParameters )
```

Macros

```
#define     ReplacementText         TextToBeReplaced
```

Control Structures

The following control structures are available:

if structures --

>if *condition*
>>*statement(s)*
>
><elseif *condition*>
>>*statement(s)*
>
><else>
>>*statement(s)*
>
>end while structures --

>while *condition*
>>*statement(s)*
>
>end

CBT scripts will use the LUCY syntax based on the dBase language. For more details see *Lucy/dB: A Script Language Based On The dBase Language*, Ivar Wold, July 9, 1992.

Extensions module

Description

Assigns a name to the script. In pratice, the first line of every script should be a module command, and the module name assigned should be the same as the DOS file name of the script. The module name is used to identify the script to run and unload. If a module statement is not included in the script, LUCY will automatically assign one when the module is loaded. (See the load, run and unload descriptions that follow.)

Usage

>module "*ModuleName*"

| Parameters | Type/Values | Description |
|---|---|---|
| "*ModuleName*" | string | Name given to the script by the author. |

Examples

>module "SCRIPT.SCR"
>
>// script ^Qf SCRIPT.SCR
>print

Description

Used to display information to the OXFORD ClassRoom White Board. Print will end each displayed line with a carriage return and line feed. Multiple arguments can be displayed with a single print command if separated with commas.

The script statement print is one of the more useful debugging tools. Well placed print statements throughout a script can help an author track the progress of a script, the status of CBT Objects like windows, and the values of author-defined variables.

Usage

>  print *"string"*
> > Echoes the string.
>
> print *variable*
> > Displays the contents of the variable.
>
> print *CBTObject*
> > Prints the type of the object.

Examples

>  print "Hello World!"
>  x = 3
>  print x
>  print "The Value of x is ",x load

Description

Loads a script module from another script. After a script is loaded, any functions in the script will be defined and may be accessed. Event Handlers in a script are not loaded until the script is run. Load returns the module name specified by the module command in the script. If no module command is found in the loaded script, then LUCY returns a name used internally. It is a good practice to always have a module command in a script, and to use the file name as the module name. See module.

Usage

>  load("*FileName*")

| Parameters | Type/Values | Description |
|---|---|---|
| *"FileName"* | string | DOS file name in quotes. |

Load returns the Module Name of the loaded module.

Examples

Examples of load are in the next section.

run

Description

Runs a script module from another script. A module must be loaded before it can be run.

Usage run ("*ModuleName*")

| Parameters | Type/Values | Description |
|---|---|---|
| *"ModuleName"* | string | Module Name in quotes. The Module Name is either the name specified by the module command in the script module, or a Name returned by the load command. |

Examples

All three of the following examples will load and run the specified script:
Example 1 --
```
load ("cbt1.scr")
run ("cbt1.scr")
```
Example 2 --
```
handle = load ("cbt2.scr")
run ( handle)
```
Example 3 --
```
run ( load ( "cbt3.scr "))
``` unload

Description

Unloads the specified script, destroying all the variables, objects, functions, and handlers defined in the script.

Usage unload ("*ModuleName*")

| Parameters | Type/Values | Description |
|---|---|---|
| "*ModuleName*" | string | Module Name in quotes. The Module Name is either the name specified by the module command in the script module, or a Name eturned by the load command. |

Examples

All three of the following examples will load, run, and unload the specified script:

Example 1 --
```
load ("cbt1.scr")
run ("cbt1.scr")
unload ("cbt1.scr")
```
Example 2 --
```
handle = load ("cbt2.scr")
run ( handle)
unload (handle)
```
Example 3 --
```
run ( load ( "cbt3.scr "))
unload ("cbt3.scr")
``` yield

Description

Yields to allow other tasks to run. Useful for "pausing".

Usage yield

Examples

The following example will create a "pause" in script of approximately 5 seconds on a 486 machine:

```
x = 0
while x < 5000
        yield           // Suspend briefly to allow
                        // other tasks to run
        x = x + 1
end
``` catch

Description

Creates an exception handler -- a way to completely jump to another point in a running script. The definition is actually an override of a method in an author-defined LUCY class. The definition requires the use of the continue LUCY reserved word. When your script calls a catch, the script jumps from the current line in script to the catch definition, executes the catch script continue statement, and jumps to the label specified in the continue. This is a complex structure that requires the author to define a class, define a catch statement, and properly place a label. Note that a catch could jump execution of a script to another modules. Also note that a catch is not like an Event Handler. It is not "loaded" and "unloaded"; it only exists while its script is running.

Usage

```
catch ObjectID.Method (Parameters)
    continue label
end
```

Examples

```
class err                     // define a new class
    function Error(m)         // define a method in the class
        print "If overloaded correctly, this won't print"
    end
end err Log      // create an instance of the err class called Log // Define the catch!
catch Log.Error()       // Overload the Log.Error method
                        //   to create the catch continue next       // Jump to the next label
end print "Start"           // First line in the body of the script
Log.Error()             // Call the catch print "This will not get printed."

next:        // The continue in the catch will jump to here
print "All Done"
```

_inspect_

Description
Prints an object's properties and current values or a variables current value on the ClassRoom White Board. This command lists on the White Board the same information displayed by ClassRoom Inspectors.

Usage

_inspect_ *id*

Examples

```
x = 4          // declare x and assign it 4
_inspect_  x   // print its value on the White Board
``` extern

Description

Allows access to functions and classes in external DLLs.

Usage

```
extern "DLLname" {
     functions;
     classses;
}
```

Examples

Browse LIBRARY.SCR for examples.

on

Description

Creates an Event Handler. See the Events section for a more thorough explanation and examples.

pass

Description

Passes an event to the next event handler in the chain. The chain has a natural order where the most recently defined handler receives the event first. See the Events section for a more thorough explanation and examples.

CBT Library

The following classes and functions are provided by LIBRARY.SCR -- defined in the library script, or as extern statements in the library accessing external DLLs.

Classes

ApplicationLink

Description

The ApplicationLink class gives authors the ability to "hook" to target applications. The application must be running for the hooking to be successful. Before window links to windows and objects in the application are set up, the script must hook to the application with ApplicationLink.

Usage

ApplicationLink   *id*   ("*AppModuleName*")

| Parameter | Type | Description |
|---|---|---|
| "*AppModuleName*" | string | To get the appropriate Application Module Name, use HeapWalker from SDK or WinSight from Borland. |

Properties

| Parameter | Access | Type/Value | Description |
|---|---|---|---|
| .EnableEvents | read/write | boolean | False (0) if events from this ApplicationLink are not to be analyze by the Event Manager. True (not 0) if events are to be analyzed and passed on to appropriate handlers. |

Examples

```
// Construct a link to ObjectVision

ApplicationLink   OVApp("Vision")
```

WindowLink

Description

The WindowLink class gives authors the ability to "hook" to windows in an applications. In order to capture events from objects in an application, these hooks must be defined. Note that every object in an application may have a WindowLink defined, including controls, menus, and dialog boxes.

Usage

WindowLink    id    (*ApplicationLinkID*, "*<Class>*", "*<Caption>*", *ResourceID*)

| Parameter | Type/Values | Description |
|---|---|---|
| *ApplicationLinkID* | ApplicationLink | Id set up by ApplicationLink of the parent application of the specified object. |
| *Class* | string | Class name of the window or object. |
| *Caption* | string | Caption or title of the window or object. |
| *ResourceID* | number | Resource Id of the window or object. |

Note that only the ClassName, Caption, or ResourceID is required to specify which Application Object. If some combination of these is required to describe a unique object, then more than one parameter must be provided. Usually ClassName and Caption, or ResourceID is enough to specify a unique object.

Properties

| Property | Access | Type/Values | Description |
|---|---|---|---|
| .Visible | read | boolean | False (0) if the window is not visible. True(not 0) if the window is visible. |
| .Caption | read | string | Contains the caption of the window. |
| .Left | read | number | Position of the left of the window in screen pixels. The top left corner of the screen is 0,0. |
| .Top | read | number | Position of the top of the window in screen pixels. The top left corner of the screen is 0,0. |
| .Width | read | number | Width of the window in pixels. |
| .Height | read | number | Height of the window in pixels. |
| .WinClass | read | string | Contains the class of the window. |
| .WinHandle | read | number | Internal handle. |
| .WindowResId | read | number | Internal identifier. |

Examples

```
// Construct a WindowLink to
// any window in the OVApp ApplicationLink
WindowLink AnyWindow(OVApp, "", "", 0)
```

```
// Construct a WindowLink to the OV Desktop
WindowLink OVWindow(OVApp,"", "ObjectVision--(Untitled)",0)

// Construct a WindowLink to the OK buttons in OVApp
WindowLink OKButton(OVApp, "", "", 1)

// display the coordinates of the OV Desktop
print "The OV Desktop is at ",OVWindow.Left, " , ", OVWindow.Top
```

Resources

Description

The Resources class gives authors the ability to "hook" to Resource Files containing string tables, dialog boxes, and bitmaps.

Note that currently all dialog and string resources are stored in DLLs.

Usage

Resources *id* ( "*ResourceFile*" )

| Parameter | Type/Values | Description |
|---|---|---|
| "*ResourceFile*" | string | Name of the file containing resources. If the path is not specified, OXFORD will look in the scripts directory for the Resource File name. |

Properties

| Property | Access | Type/Values | Description |
|---|---|---|---|
| .Instance | read | number | Internal identifier. |

Methods

.GetText(*StringId*)

Loads and returns a string identified by StringId from the resource file. A hard return in a string resource can be specified by placing a carriage return line feed sequence, "\r\n", in the text.

| Parameter | Type/Values | Description |
|---|---|---|
| *StringId* | number | Resource Id of a string to be returned. |

Examples

```
// Create a connection to a resource DLL
// which contains the strings for the script
Resources Strings("RES.DLL")
```

```
// print the string table entry with the id 5001
print Strings.GetText(5001)

#define HelloWorld    5002
// print the string table entry with the id HelloWorld (5002)
print Strings.GetText(HelloWorld)
```

Window

Description

The Window class gives authors the ability to create their own windows and dialogs.

There are four types of windows that can be created for display: Media Windows, Dialog Windows, Child Windows, and Child Media Windows. Media Windows are windows drawn over the desktop that can be resized, assigned bitmaps or metafiles, shown or hidden, and covered with text. They can also display other types of media such as video. Their look and behavior is completely under script control. Dialog Windows are defined as Dialog Boxes in Resource Workshop. They contain graphics and controls that can be accessed and modified through script. Child Windows are used for controls in Dialog Windows that do not contain text or graphics. Child Media Windows are used for controls in a resource-defined Dialog Window that contain text and/or graphics. They allow authors to create multiple regions of text and graphics in a Dialog Window, and manipulate them independently.

Each of these author defined window types is constructed using Window.

Usage

To create a Media Window object:

Window   *id*   ( *Style* )

To create a Dialog Window object:

Window   *id*   ( *ResourceObject*, "*DialogName*")

To create a Child Window object:

Window   *id*   ( *WindowID*, *ResourceID* )

To create a Child Media Window object:

Window   *id*   ( *WindowID*, *ResourceID* , *MediaType*)

| Parameter | Type/Values | Description |
| --- | --- | --- |
| *Style* | WS_POPUP | A basic pop-up window. |
| | WS_CAPTION | A single thin border with a title bar where a caption can be displayed. The default style. |

| | | |
|---|---|---|
| WS_THICKFRAME | | Places a thick frame frame around the window that gives the user the ability to resize the window. |
| WS_SYSMENU | | Includes a System menu box on the left side of the title bar. |
| WS_DLGFRAME | | Gives the window a thick dialog frame. |

Styles can be combined using "|". For example to create a pop-up window with a caption and system menu the script command would be:

Window      W ( WS_POPUP | WS_CAPTION | WS_SYSMENU )

The default -- i.e. Window W() -- is (WS_POPUP|WS_CAPTION).

Note that once a window is defined, its style cannot be changed.

| | | |
|---|---|---|
| *ResourceObject* | Resources | A Resource Object defined by Resources. |
| *"DialogName"* | string | The name of a Dialog Resource. |
| *WindowID* | Window | A Window Object. Specifies a previously defined Dialog Window. |
| *ResourceID* | number | A resource id from a Resource File. Specifies a particular control (Child or Child Media Window) in a Dialog Box. |
| *MediaType* | MT_IMAGE | The type of media "played" in the Window. Currently there is only one type, MT_IMAGE, which displays bitmaps and metafiles. |

Properties

The following properties are available with all Window types:

| Property | Access | Type/Values | Description |
|---|---|---|---|
| .Visible | read/write | boolean | If false (0) the window is not visible on the screen. If true (not 0) the window is visible on the screen. |
| .Caption | read/write | string | The title text visible on the caption bar at the top of the window. |

| Property | Access | Type/Values | Description |
|---|---|---|---|
| .Left | read/write | number | The location in pixels of the upper left hand corner of the window in the horizontal direction (the x-axis). Coordinates are in global screen coordinates. |
| .Top | read/write | number | The location in pixels of the upper left hand corner of the window in the vertical direction (the y-axis). Coordinates are in global screen coordinates. |
| .Width | read/write | number | The width of the window (the horizontal direction) in pixels. |
| .Height | read/write | number | The height of the window (the vertical direction) in pixels. |
| .WinClass | read | CBTWindow | Class of all Windows used in CBT Presentation. |
| .WinHandle | read | number | Internal Window handle. |
| .WindowResId | read | number | Internal Window identifier. |

The following properties are available only for Media and Child Media Window types:

| Property | Access | Type/Values | Description |
|---|---|---|---|
| .Image | read/write | string | The background image of the window. Image can be a bitmap or a metafile. The string should be the DOS file name of the graphic. Note for Child Media Windows, if no image is assigned, then background graphics show through. Also, the path name used by the system to find bitmap files is the last path accessed by the Load/Run Dialog Box. |
| .Text | read/write | string | The text written to the text region of a Media or Child Media Window. |
| .TextLeftMargin | read/write | number | Left Margin of the Text Region in pixels. |
| .TextRightMargin | read/write | number | Right Margin of the Text Region in pixels. |
| .TextTopMargin | read/write | number | Top Margin of the Text Region in pixels. |
| .TextBottomMargin | read/write | number | Bottom Margin of the Text Region in pixels. |

| | | | |
|---|---|---|---|
| .TextFont | read/write | string | "MODERN", "SWISS", or "ROMAN" font may be specified for a particular Media or Child Media Window. The default is "SWISS". |
| .TextFontSize | read/write | number | Font Size for all Media or Child Media Window text in points -- sizes 1 through 72. The default size is 8 point. |

Methods

.Arrow (*TargetWindow* <, *RGBColor* <, *x* <, *y* <, *width* <, *height*> > > > >)

Draws an Arrow from the Window to the Target Window. The user mouse click will erase the arrow. If the user mouse click was in the Window, the Window will remain visible. If the user mouse click is outside the Window, the Window will be set invisible.

| Parameter | Type/Values | Description |
|---|---|---|
| *TargetWindow* | WindowLink | WindowLink id. |
| *RGBColor* | RGB_Color | Arrow color. Possible values are: RGB_WHITE, RGB_GRAY, RGB_GRAY, RGB_RED, RGB_GREEN, RGB_BLUE, RGB_YELLOW, RGB_MAGENTA, RGB_CYAN, RGB_DKRED, RGB_DKGREEN, RGB_DKBLUE. |
| *x* | number | Defines the left border of a region in the Target Window where the arrow will point, in pixels, in the Target Windows coordinate system. If x, y, width, and height are omitted, the arrow will point to the closest corner of the target. |
| *y* | number | Defines the top border of a region in the Target Window where the arrow will point, in pixels, in the Target Windows coordinate system. If x is used, but y, width, and height are omitted, y, width, and height all default to zero. |
| *width* | number | Defines the width of a region in the Target Window where the arrow will point, in pixels, in the Target Windows coordinate system. If x and y are used, but width and height are |

| | | |
|---|---|---|
| | | omitted, width and height default to zero. |
| *height* | number | Defines the height of a region in the Target Window where the arrow will point, in pixels, in the Target Windows coordinate system. If x, y, and width are used, but height is omitted, height defaults to zero. |

Examples

In the following examples assume two Resources Objects:

```
// Define Resource Objects
Resources   Res ("RES.DLL")
Resources   Strings ("STRING.DLL")
```

Create Dialog Windows and Child Media Windows:

```
// Create a Dialog Window --
//    Res contains a dialog box called DialogTemplate
Window Menu(Res, "DialogTemplate")

// Create Child Media Window objects linked to
//     ids (Static Resources)  in the DialogTemplate
//     dialog box.
Window MenuImage(Bubble, 203, MT_IMAGE)
Window MenuText(Bubble, 202, MT_IMAGE)
Window MenuTitle(Bubble, 201, MT_IMAGE)

// Change the font and font size of the
//    title and text Child Media Windows.
MenuTitle.TextFont = "ROMAN"
MenuTitle.TextFontSize = 10
MenuText.TextFont = "ROMAN"
MenuText.TextFontSize = 8

// Make the Menu Dialog Window visible
Menu.Visible = .t.
```

Create Media Windows and change their background Images:

```
// Define a new Media Window -- no caption bar!
Window InfoWnd(WS_POPUP)

// Set the Image in InfoWnd to a bitmap
InfoWnd.Image = "info.bmp"
InfoWnd.Visible = .t.
```

```
// Change the Image in InfoWnd to a MetaFile
InfoWnd.Visible = .f.
InfoWnd.Image = "bird.wmf"
InfoWnd.Visible = .t.

// This is tricky!  The string 3045 in the Strings
//    resource file contains a string that specifies
//    an image file to load into InfoWnd's Image.
InfoWnd.Visible = .f.
InfoWnd.Image = Strings.GetText(3045)
InfoWnd.Visible = .t.
```

Commands and Functions

LaunchApplication

Description

Runs the specified application. The path must be provided, or the application must be located in the DOS path.

Usage

LaunchApplication ( *"Application"*, *RunState* )

| Parameters | Type/Values | Description |
| --- | --- | --- |
| *RunState* | SW_SHOWNORMAL | Run the application in a window. |
| | SW_SHOWMINIMIZE | Run the application as an icon. |
| | SW_SHOWMAXIMIZE | Run the application so that it fills the entire desktop. |

Examples

The following example launches ObjectVision from the path provided:

```
// Launch OV
LaunchApplication("c:\vision\vision", SW_SHOWNORMAL)
```

DELETE

Description

Destroys the specified variable or object. Note this command is actually a macro defined in LIBRARY.SCR. This macro actually redefines the specified variable or object to be a variable with the value of zero. This has the effect of destroying the old definition of the variable or object and all its properties and values.

Usage

DELETE ( Id )
        Id    Variable or object to be destroyed.

Examples

To destroy a Window:

```
Window    w (WS_POPUP)     // Creates the window
DELETE (w)                 // Destroys the window
```

Event Handlers

With LUCY and the CBT Presentation System, it is possible for authors to build event handlers that capture user events such as mouse clicks and key presses before they are received by an Application. These event handlers are actually predefined methods of each CBT Object. For example, the WindowLink CBT Object has a method called MouseClick -- given the WindowLink W, W.MouseClick is a method. When we create an event handler, we are actually overloading this method; we are creating a new definition for the method in our script. When the Event Dispatcher captures an event, if a script has created a new definition for the method, then the scripts method will get executed. To carry our example further, if we wanted to define an event handler in script to collect every mouse click in WindowLink W of an application, we would use the following:

```
on W.MouseClick ( info)
      print "Mouse Click Event in WindowLink W"
end
```

Using "on" this script example has overloaded the MouseClick method of W. Every time a mouse click event occurs in W, the print statement within the handler will get executed.

Currently Event Handlers can be defined for WindowLink, Dialog Window, and Child Window Objects. Every Event Handler has the following syntax:

```
on  CBTObject.Event (EventInformation)
                  •
end
```

The following sections describe the events and the information that accompanies each event.

Events

The events currently implemented for WindowLinks are:

. MouseEnter (EventInformation)        . Activate (EventInformation)

. MouseLeave (EventInformation)        . Deactivate (EventInformation)

. MouseClick (EventInformation)

One event has been implemented for Dialog Windows:

. Control (EventInformation)

One event has been implemented for Hilltop WindowLinks:

. NotHandled (EventInformation)

Event Information

With every event, event information is passed to the Event Handler. The Event Information is itself an object, and these event information objects have properties accessible to the author:

| Field | Access | Type/Values | Description |
| --- | --- | --- | --- |
| . WindowName | read only | string | Caption of the window generating the event. |
| . ClassName | read only | string | Class name of the window generating the event. |
| . WindowId | read only | number | Resource Id of the window generating the event. For example in a Dialog Window Control event, the ResourceId would be the id of the button being depressed. |
| . WindowStyle | read only | | Style of the window generating the event. |
| . StopMessage | read/write | boolean | A flag that indicates to the CBT message handler whether or not the event should be passed to the application. If set to true, the event will not be passed. If set to false, the event will be passed. The default is false. |

Script Structure

Scripts

Resources

It is good practice to keep an empty template DLL. Authors can copy and use this DLL to store resources using Resource Workshop, and not need to do a separate decompile. Resource Workshop will update the DLL when the file is saved.

What is claimed is:

1. In a computer system, said system including application software operating in response to system and user events, a method for directing operation of the computer system comprising:
   (a) monitoring said events;
   (b) reporting to said system desired ones of the events as a message;
   (c) comparing said message with script instructions, said script instructions specifying at least one application software action to occur in response to a message; and
   (d) directing operation of said application software according to said script instructions.

2. The method of claim 1, wherein step (a) includes: installing at least one event hook in said application software for trapping events from said application software.

3. The method of claim 2, further comprising: blocking selected ones of the trapped events from reaching the application software.

4. The method of claim 2, wherein said application software includes resource means for receiving user input, and wherein said installing an event hook step includes monitoring events occurring at resource means of interest.

5. The method of claim 2, wherein said installing an event hook step includes the substep of:
   registering a callback function with said application software, said callback function receiving messages indicating internal events of said application software.

6. The method of claim 1, wherein said system includes a windows graphic user interface, and wherein each of said events is represented within the windows graphic user interface by a single system message.

7. The method of claim 6, wherein step (d) includes: sending at least one system message to said application software for effecting a specific operation of said application software.

8. The method of claim 1, wherein step (b) includes:
   identifying at least one of the events; and
   assigning a message identifier to said identified at least one event.

9. The method of claim 8, wherein step (c) includes:
   matching the message identifier to an event handler; and
   if a match is found, invoking the event handler with the message identifier, whereupon said event handler processes said identified at least one event in accordance with selected ones of the script instructions.

10. The method of claim 1, wherein said script instructions includes at least one keyword corresponding to a selected one of the messages, whereupon a desired action in the application software is effected in response to occurrence of events identified by the selected message.

11. The method of claim 10, wherein said script instructions includes a plurality of keywords for processing a plurality of events in the application software, whereby operation of the application software is directed at least in part by sequence of said script instructions.

12. The method of claim 1, wherein said script instructions include information for tutoring a user of the application software.

13. The method of claim 12, wherein said message identifies a particular task of the application software, and wherein said information for tutoring the user is specific for said particular task.

14. The method of claim 1, wherein said application software includes at least two target applications operating concurrently.

15. The method of claim 14, wherein said task of the application software includes a user-directed operation occurring between said at least two target applications.

16. The method of claim 1, further comprising:
   (e) repeating steps (a)–(d) until operation of application software is terminated.

17. The method of claim 1, wherein said message is a meta-message representing multiple low-level events.

18. The method of claim 1, wherein said events includes application-specific events which result from non-system events occurring within said application software.

19. The method of claim 1, wherein said script instructions include a selected one of a text file and a compiled text file instructing operation of pre-existing application software.

20. A computer-based system comprising:
   (a) a computer for operating application software;
   (b) means for monitoring events of said application software;
   (c) means, coupled to said monitoring means, for translating a series of said events into a single message;
   (d) means, coupled to said translating means, for comparing the message with user-specified instructions, said instructions specifying at least one application software action to occur in response to a message; and
   (e) if a match is found in step (d), invoking said user-specified instructions for effecting said at least one action.

21. The system of claim 20, wherein said means for monitoring events includes:
   means for installing a hook in said application software for trapping events thereof.

22. The system of claim 21, wherein said hook includes a selected one of a system hook and a callback function.

23. The system of claim 20, wherein said means for translating a series of events includes:
   means for storing information representing characteristics of the application software during the event as an information object.

24. The system of claim 23, wherein said application software includes a windows interface, and wherein said characteristics include a windows class, a windows name, and a resource ID.

25. The system of claim 20, wherein said means for translating a series of events includes;
   means for identifying a sequence of events as a particular state of interest; and
   means for identifying said state with a unique message identifier.

26. The system of claim 20, wherein said application software includes a plurality of software applications operating concurrently.

27. The system of claim 20, wherein said application software includes at least one of a spreadsheet application program, database application program, and a wordprocessing application program.

28. The system of claim 20, wherein said comparing means includes:
  a plurality of message handlers, each for processing at least one message of interest; and
  means for matching a message with a single message handler.

29. In a computer system, said system for operating application software in an event-driven windows user interface and including system messages, an improved method for computer-based training comprising:
  (a) monitoring events of at least one target application of interest by trapping system messages;
  (b) identifying a plurality of events as a single state of said at least one target application;
  (c) comparing the identified state with a set of instructions, said instructions indicating action to be taken in response to selected states; and
  (d) in response to a match of a state with a desired action, effecting the desired action by sending at least one system message to said at least one target application.

30. The method of claim 29, wherein said interface includes a plurality of resources for receiving user input, and wherein step (a) includes:
  linking to at least one resource of the application, and
  monitoring events which occur at said at least one resource which are linked.

31. The method of claim 30, wherein said resources include selected ones of screen buttons, menu items, and dialog box controls.

32. The method of claim 29, wherein said interface generates messages specifying system events, and wherein said at least one target application generates application-specific messages specifying application internal events.

33. An improved computer-based training system, said system operative in an event-driven architecture having at least one application software program and system messages, the improvement comprising:
  means for trapping said system messages occurring in the event-driven architecture; and
  means, coupled to said trapping means, for bi-directional communication between said computer-based training system and said at least one application software program, said bi-directional communication means including:
  means for communicating to the computer-based training system a plurality of the system messages as a single high-level message;
  means for specifying an action to be taken in response to receiving said single high-level message; and
  means for communicating to said at least one application software program the action to be taken as at least one system message.

* * * * *